United States Patent
Lamm, Sr.

(10) Patent No.: US 8,473,528 B2
(45) Date of Patent: Jun. 25, 2013

(54) DELIVERY ENABLEMENT WORKFORCE UTILIZATION TOOL INTEGRATION

(75) Inventor: Kevan Warren Lamm, Sr., Gainesville, FL (US)

(73) Assignee: Accenture Global Services, Schaffhausen (CH)

( * ) Notice: Subject to any disclaimer, the term of this patent is extended or adjusted under 35 U.S.C. 154(b) by 875 days.

(21) Appl. No.: 12/191,773

(22) Filed: Aug. 14, 2008

(65) Prior Publication Data
US 2010/0042634 A1 Feb. 18, 2010

(51) Int. Cl.
G06F 17/30 (2006.01)

(52) U.S. Cl.
USPC .................................. 707/813; 707/999.107

(58) Field of Classification Search
None
See application file for complete search history.

(56) References Cited

U.S. PATENT DOCUMENTS

| | | |
|---|---|---|
| 7,302,643 B1 | 11/2007 | Edlund et al. |
| 2004/0181446 A1 | 9/2004 | Vance |
| 2005/0209901 A1* | 9/2005 | Miller et al. ........................ 705/8 |
| 2006/0005158 A1 | 1/2006 | Pike et al. |
| 2007/0245300 A1 | 10/2007 | Chan et al. |
| 2008/0046804 A1* | 2/2008 | Rui et al. ......................... 715/212 |
| 2008/0208652 A1* | 8/2008 | Srivastava .......................... 705/7 |
| 2009/0171889 A1* | 7/2009 | Friedlander et al. .............. 707/2 |

FOREIGN PATENT DOCUMENTS

WO 0075837 A2 12/2000

* cited by examiner

Primary Examiner — Anteneh Girma

(57) ABSTRACT

Methods, computer-readable media, and apparatuses support data entry and aggregate work entries for an account. Different work codes are mapped to different categories for an account. Work entries are aggregated for the different categories in a report or in an invoice for the account. A worker may be mapped to client, which may further include a client region, when aggregating work entries to different categories for an account. A data structure is formed to include account information. The data structure can assume different structure types, including a data cube having three or more dimensions. A spreadsheet file may be linked to the data structure, and the contents a database may be synchronized to the spreadsheet file. The contents of the database may be categorized, analyzed, and aggregated, in which the contents are exported to provide a report on a worker and/or account.

31 Claims, 36 Drawing Sheets

| CODES | Description | Client1 | Client2 | Client3 | ClientN |
|---|---|---|---|---|---|
| INST01 | PTO - Public Holiday, F | C - Load WBS Activity | C - Load WBS Activity | C - Load WBS Activity | C - Load WBS Activity |
| INST02 | Travel - not included in t | E - PWA Only Tracked Activity | E - PWA Only Tracked Activity | E - PWA Only Tracked Activity | E - PWA Only Tracked Activity |
| INST03 | Training - Internal Acce | D - Misc Activity | D - Misc Activity | D - Misc Activity | D - Misc Activity |
| INST04 | SME Input - funded by | A - Client Paid For Activity | D - Misc Activity | D - Misc Activity | A - Client Paid For Activity |
| INST05 | Travel - included in time | B - Client NonPaid For Activity | B - Client NonPaid For Activity | B - Client NonPaid For Activity | B - Client NonPaid For Activity |
| INST06 | Non core client delivery | D - Misc Activity | D - Misc Activity | D - Misc Activity | D - Misc Activity |
| INST07 | Pre and post session de | A - Client Paid For Activity | B - Client NonPaid For Activity | B - Client NonPaid For Activity | A - Client Paid For Activity |
| INST08 | ACI Time | A - Client Paid For Activity | A - Client Paid For Activity | A - Client Paid For Activity | A - Client Paid For Activity |
| INST09 | Quality Observation - M | A - Client Paid For Activity | B - Client NonPaid For Activity | B - Client NonPaid For Activity | A - Client Paid For Activity |
| INST10 | Classroom Setup and T | A - Client Paid For Activity | B - Client NonPaid For Activity | B - Client NonPaid For Activity | A - Client Paid For Activity |
| INST11 | Approved client training | A - Client Paid For Activity | B - Client NonPaid For Activity | B - Client NonPaid For Activity | A - Client Paid For Activity |
| INST12 | Performing Dual Role - | A - Client Paid For Activity | B - Client NonPaid For Activity | B - Client NonPaid For Activity | A - Client Paid For Activity |
| INST13 | Community Activities (t | C - Load WBS Activity | C - Load WBS Activity | C - Load WBS Activity | C - Load WBS Activity |
| INST14 | On Site Course Custom | A - Client Paid For Activity | A - Client Paid For Activity | A - Client Paid For Activity | A - Client Paid For Activity |
| INST15 | Content Design - CDC - | A - Client Paid For Activity | B - Client NonPaid For Activity | B - Client NonPaid For Activity | A - Client Paid For Activity |
| INST16 | Continuous Improvemen | C - Load WBS Activity | C - Load WBS Activity | C - Load WBS Activity | C - Load WBS Activity |
| INST17 | Instructor Prep - Time s | A - Client Paid For Activity | B - Client NonPaid For Activity | B - Client NonPaid For Activity | A - Client Paid For Activity |
| INST18 | Instructor Prep - Time s | A - Client Paid For Activity | B - Client NonPaid For Activity | B - Client NonPaid For Activity | A - Client Paid For Activity |
| INST19 | Instructor Prep - Time s | A - Client Paid For Activity | B - Client NonPaid For Activity | B - Client NonPaid For Activity | A - Client Paid For Activity |
| INST20 | Instructor Observation/K | A - Client Paid For Activity | B - Client NonPaid For Activity | B - Client NonPaid For Activity | A - Client Paid For Activity |
| INST21 | Performance Manageme | C - Load WBS Activity | C - Load WBS Activity | C - Load WBS Activity | C - Load WBS Activity |
| INST22 | Non client org meetings | C - Load WBS Activity | C - Load WBS Activity | C - Load WBS Activity | C - Load WBS Activity |
| INST23 | Admin Time - Email, Art | C - Load WBS Activity | A - Client Paid For Activity | B - Client NonPaid For Activity | A - Client Paid For Activity |
| INST24 | Instructor - Master Instru | A - Client Paid For Activity | E - PWA Only Tracked Activity | E - PWA Only Tracked Activity | E - PWA Only Tracked Activity |
| INST25 | Flex Time | E - PWA Only Tracked Activity | B - Client NonPaid For Activity | B - Client NonPaid For Activity | B - Client NonPaid For Activity |
| INST26 | Down Time - Time spent | B - Client NonPaid For Activity | A - Client Paid For Activity | A - Client Paid For Activity | A - Client Paid For Activity |
| INST27 | vLAB - Time spent supp | A - Client Paid For Activity | A - Client Paid For Activity | A - Client Paid For Activity | A - Client Paid For Activity |
| INST28 | Team Meetings - Client | A - Client Paid For Activity | B - Client NonPaid For Activity | B - Client NonPaid For Activity | A - Client Paid For Activity |
| INST29 | Other approved absence | C - Load WBS Activity | C - Load WBS Activity | C - Load WBS Activity | C - Load WBS Activity |
| INST30 | CLIENT Admin Time | A - Client Paid For Activity | B - Client NonPaid For Activity | B - Client NonPaid For Activity | A - Client Paid For Activity |
| OnPlatform | On Platform Time | A - Client Paid For Activity | A - Client Paid For Activity | A - Client Paid For Activity | A - Client Paid For Activity |

DELIVERY ENABLEMENT WORKFORCE UTILIZATION TOOL INTEGRATION

FIELD

This invention relates generally to a data entry process. More particularly, the invention provides methods, apparatuses, and computer readable media for processing time entries for an account.

BACKGROUND

Business philosophy, according to prior art, emphasizes business independence, in which a business strives to provide needed goods and services within the business itself. For example, a business may support its own education center to train its employees. However, this business philosophy is evolving, where a business is increasingly dependent on other businesses for goods and services. There are a multitude of reasons in the marketplace for this trend resulting from economic considerations and increased specialization.

In order to support an inter-business relationship, a supply company often provides goods or services to multiple businesses under different contractual obligations. For example, a supply company that provides services to different companies typically requires an effective time entry system to verify compliance to contractual obligations as well as for monitoring costs in providing services. The time entry system should facilitate time entry by its employees while accurately recording and reporting time entries in accordance with specific business stipulations with the supported companies.

BRIEF SUMMARY

The present invention provides methods, apparatuses, and computer-readable media for a data entry process that supports aggregating work entries for an account.

With another aspect of the invention, different work codes are mapped to different categories for an account. A work code may further map to different categories for different accounts. Work entries entered by a worker are associated with the mapped category for the account. The work entries are aggregated for the different categories in a report for the account.

With another aspect of the invention, a worker is mapped to client, which may further include a client region, when aggregating work entries to different categories for an account.

With another aspect of the invention, a data structure is formed to include account information. The data structure may assume different structure types, including a data cube having three or more dimensions. A spreadsheet file may be linked to the data structure, and the contents of a database may be synchronized to the spreadsheet file. The contents of the database may be categorized, analyzed, and aggregated, in which the contents are exported to provide a report on a worker and/or account. The work efficiency of a worker can be determined based on the processed database contents.

With another aspect of the invention, different work codes are mapped to different categories for an account. A work code may further map to different categories for different accounts. Work entries entered by a worker are associated with the mapped category for the account. The work entries are aggregated for the different categories in order to generate an invoice for the account.

BRIEF DESCRIPTION OF THE DRAWINGS

The present invention is illustrated by way of example and not limited in the accompanying figures in which like reference numerals indicate similar elements and in which:

FIG. 2 shows a screenshot in which queries are driven by tables where account guidelines are based on codes in accordance with an embodiment of the invention.

FIG. 3 shows a screenshot in which all individuals are mapped to a client and region where an individual is assigned a category for each code in accordance with an embodiment of the invention.

FIG. 5 shows a screenshot in which data from a database is available for analysis in accordance with an embodiment of the invention.

FIG. 9 shows a screenshot in which pre-built reports are available to provide a detailed analysis by organization, client, individual, and month in accordance with an embodiment of the invention.

FIG. 13 shows a screenshot for collecting requirements via a spreadsheet template in accordance with an embodiment of the invention.

FIG. 15 shows a screenshot for setting metadata for Project Plan in accordance with an embodiment of the invention.

FIG. 27 shows a screenshot in which each time period (month) being analyzed by individual and category using SQL statement in accordance with an embodiment of the invention.

FIG. 33 shows a screenshot in which exemplary exported spreadsheet results in accordance with an embodiment of the invention.

FIG. 35 shows a screenshot in which reports providing an analysis across individual and account in accordance with an embodiment of the invention.

DETAILED DESCRIPTION

Figure 1:
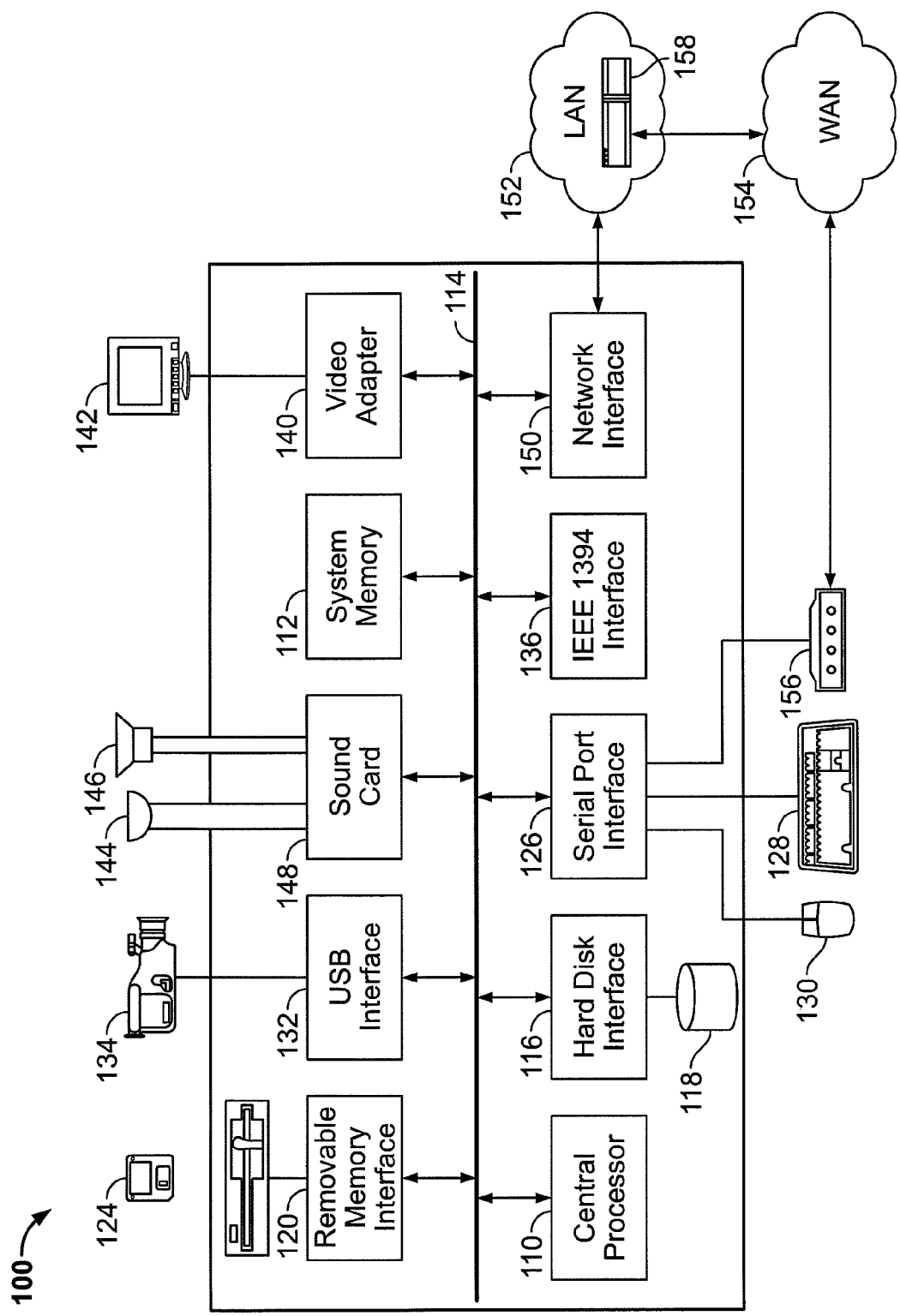
FIG. 1 shows a computer system used in an advanced payment integrity system in accordance with an embodiment of the invention.
Figure 12:
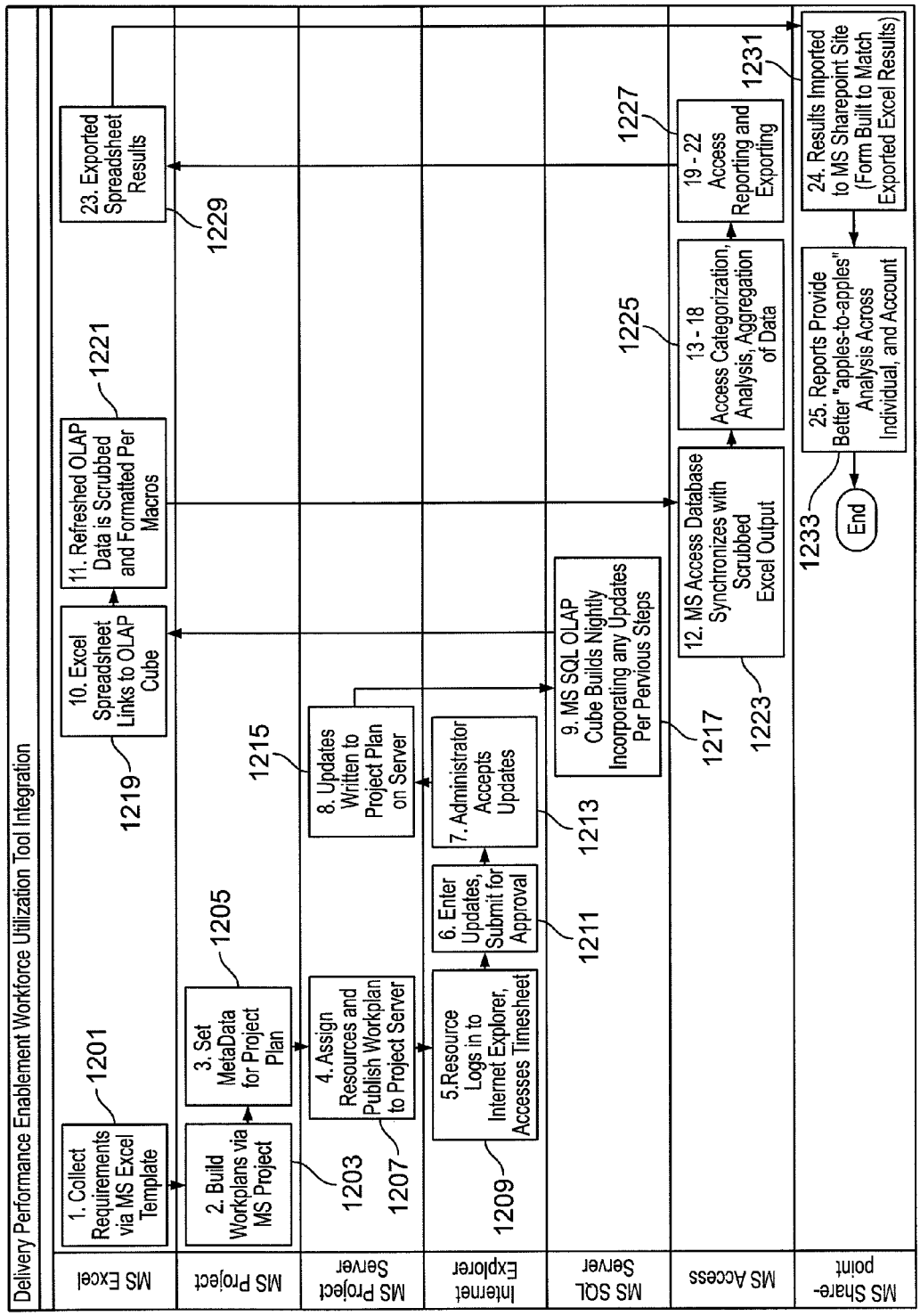
FIG. 12 shows a process flow between different software applications in accordance with an embodiment of the invention.

Elements of the present invention may be implemented with computer systems, such as the system 100 shown in FIG. 1. System 100 may execute a process (e.g. process 1200 as shown in FIG. 12) in accordance with aspects for the invention as disclosed herein.

Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may be configured to operate with particular manufacture interfaces such as FireWire developed by Apple Computer and i.Link developed by Sony. Input devices may also be coupled to system bus 114 through a parallel port, a game port, a PCI board or any other interface used to couple an input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

FIG. 2 shows screenshot 200 in which queries are driven by tables where account guidelines are based on codes in accordance with an embodiment of the invention.

Embodiments of the invention may leverage multiple applications to effectively capture, analyze, and report on a global workforce's effort and time expenditures (in addition to time tracking). A process may be internally administered to allow for greater granularity of reporting and nimble updating.

With an exemplary embodiment, as disclosed herein, an end-to-end process (e.g., process 1200 as shown in FIG. 12) includes the following procedures. Each procedure indicates related steps that are included in process 1200.

Scoping workplan metadata (step 1205)

Creating workplans in Microsoft Project® tagged appropriately (steps 1201 and 1203)

Workplans uploaded to Microsoft Project Web Access (PWA) platform (step 1207)

Workforce accesses Project based timesheets using Microsoft Internet Explorer® web browser and enters actual work experience (step 1209)

Microsoft PWA data collected in Microsoft SQL database (steps 1211, 1213, and 1215)

On-Line Analytical Processing (OLAP) datacube collates entries from individual in report format (step 1217)

Local spreadsheet (e.g., Microsoft Excel®) queries OLAP database and ports data to local spreadsheet (step 1219)

Microsoft Access™ database links to local Excel file using internal refresh and uses data as table (steps 1221 and 1223)

Multiple data tables in Microsoft Access database allow the administrator to modify resource (and account level) characteristics (client paid for activity, load activity, tracking activity, etc.) and categories (step 1225)

Queries combine and aggregate data tables into cohesive reports (organization level data) (step 1227)

Aggregated reports output into Microsoft Excel format (step 1229)

Excel reports are uploaded to pre-built Microsoft SharePoint® form (step 1231)

Microsoft SharePoint form available to select groups based on organization level taxonomy structure created using Microsoft Exchange functionality (step 1233)

Final output from data analysis available in Microsoft PowerPoint® format (charts, etc.) on a monthly (and ad hoc) basis (step 1235)

At each interface between applications, administrative controls are provided, including metadata, OLAP refreshes, Excel formatting, Access table structure and queries, Access to Excel reports, and custom (user driven) reporting on SharePoint. The tools use business rules to validate and report data, mitigating the potential for human error (and interference) in the reporting process. For example, when a new workplan is created, the metadata for that plan may be driven from an administratively maintained list. Furthermore, the Access database synchronizes the data tables with the resources created on the Project Server. When new individuals are added to the system, they are recognized as "unmatched" and flagged for client and categorization against the various workplans.

By mapping work codes to the appropriate category, a client may be more accurately billed for a workplan in accordance with contractual obligations. In addition, a work efficiency for worker delivery services to the client may be measured. For example, the percentage of time that is billable to the client to the total time expended by each worker may be gauged. Consequently, corrective action may be taken for workers that do not achieve targeted goals.

Referring to the example shown in FIG. 2, each work code (INST01, INST02, . . . , INST30, and OnPlatform) is mapped into one of five categories by account, where:

"A" denotes "Client Paid"

"B" denotes "Client Non-Paid"

"C" denotes "Load WBS Activity"—Work breakdown structure (WBS) codes are alphanumeric codes that identify each task's unique place in the outline structure of a project. They can be used for reporting schedules and tracking costs. WBS may refer to the code hours that are assigned to.)

"D" denotes "Miscellaneous Activity (non delivery client WBS)"

"E" denotes "PWA (Project Web Access)-only tracked activity"

Work codes (shown as codes in FIG. 2) are typically associated with different work activities. For example, INST01 corresponds to paid time off (PTO), INST10 corresponds to class setup, and INST24 corresponds to instructing a class. On Platform corresponds to the time an instructor is teaching a class. Work codes are mapped to different categories based on the client. For example, entry 201 corresponds to work code INST10 and is client paid (category A) for client 1, 2, and N but not for client 3 (corresponding to category B). Differences in categories may be due to different factors such as conditions specified in a contract and so forth. Embodiments of the invention can support different work codes and different categories that may vary from account to account.

With embodiments of the invention, the mapping of work codes to categories can dynamically change. For example, referring to entry 201, work code INST10 maps to category A (client paid for activity) for client 1. However, a contract with client 1 may be re-negotiated so that work associated with INST10 is not client paid after an effective date. In such a situation, time entries after the effective date can be processed in accordance with the new mapping.

An account may correspond to a set of business stipulations that is specified in a contract with a client. An account may further correspond to different organizations of the client, including different client regions.

While FIG. 2 exemplifies an embodiment associated with a training environments, embodiments of the invention support different environments, including product development (software and/or hardware), services (e.g., consulting, legal, and accounting), and manufacturing.

Figure 3:
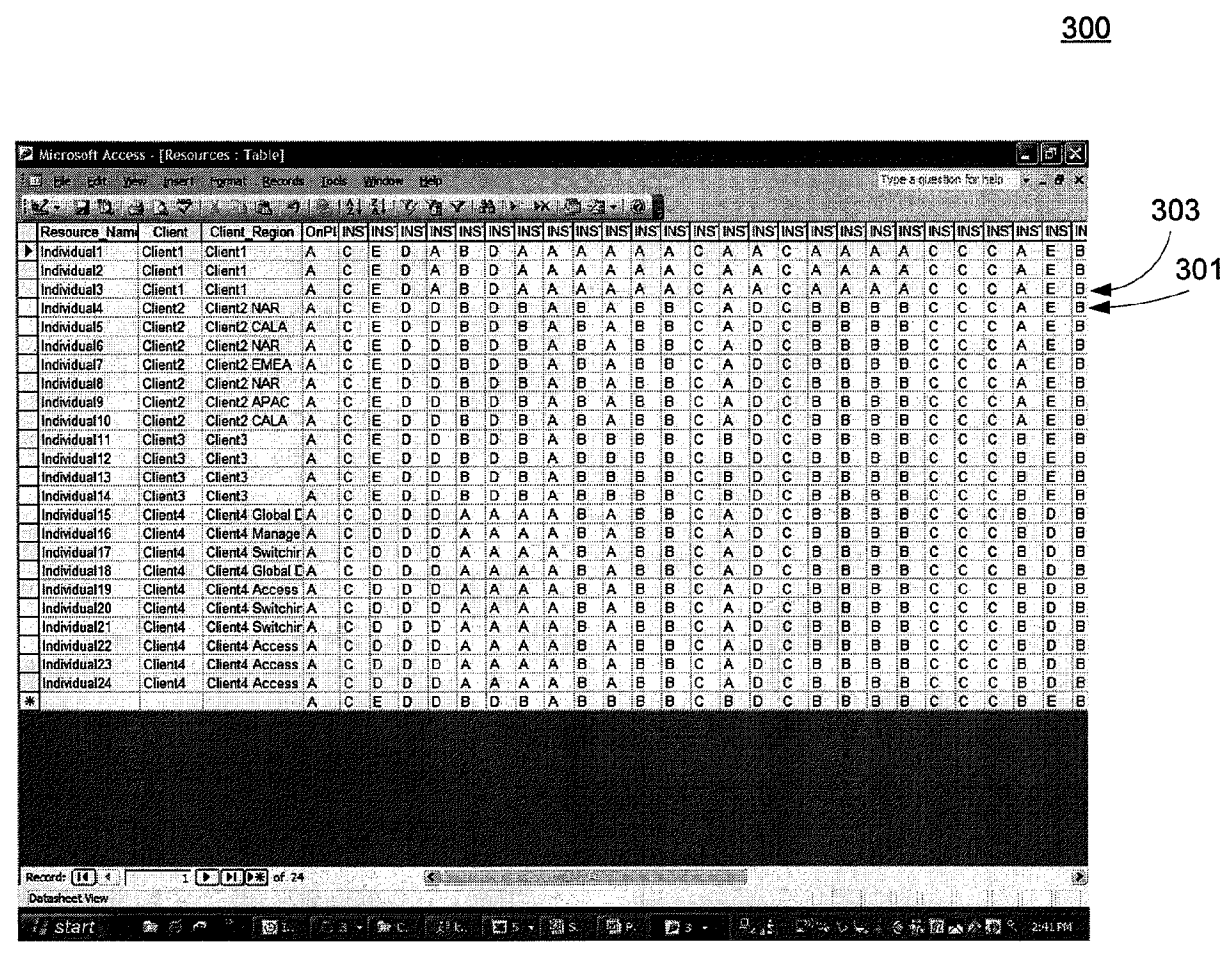

FIG. 3 shows screenshot 300 in which all individuals (workers) are mapped to a client and region (corresponding to an account) where an individual is assigned a category for each work code in accordance with an embodiment of the invention. Each worker may be mapped to a client and client region. For example, entry 301 shows a worker (Individual 4) that is associated with client 2 for the NAR region. Moreover, for each worker, each work code is categorized in one of five categories.

While screenshot 300 maps a worker to a single account, embodiments of the invention allow a single user profile to be associated with more than one account. Also, different workers associated with the same account can have different categorizations for the same work code.

Figure 4:
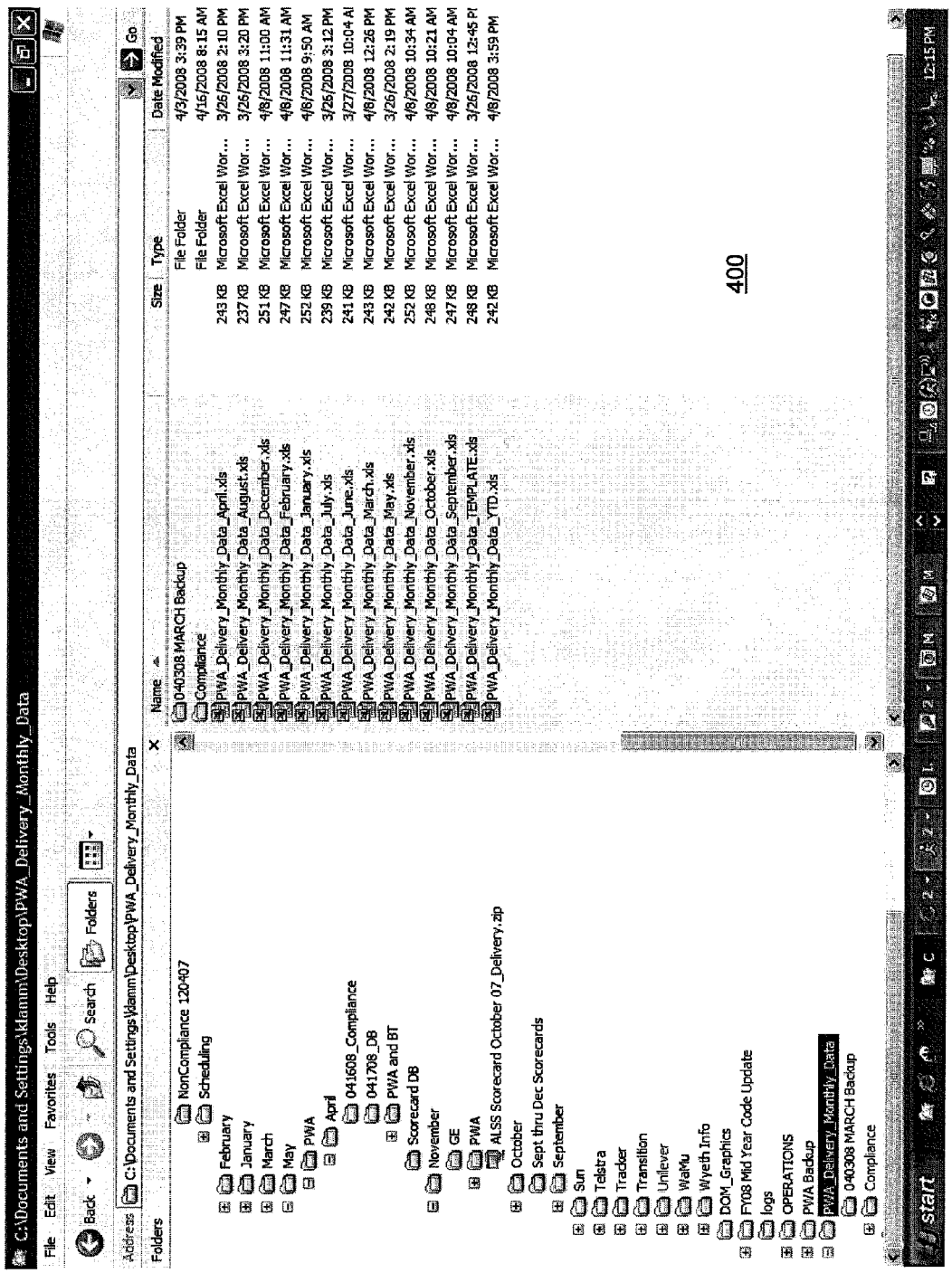
FIG. 4 shows a screenshot in which spreadsheet files are linked to a database in accordance with an embodiment of the invention.

FIG. 4 shows screenshot 400 in which spreadsheet files are linked to a database in accordance with an embodiment of the invention. With an embodiment of the invention, standalone spreadsheet files are linked to a PWA database, where an Excel file may be locally saved per month, per year-to-date (YTD), and per compliance.

Figure 5:
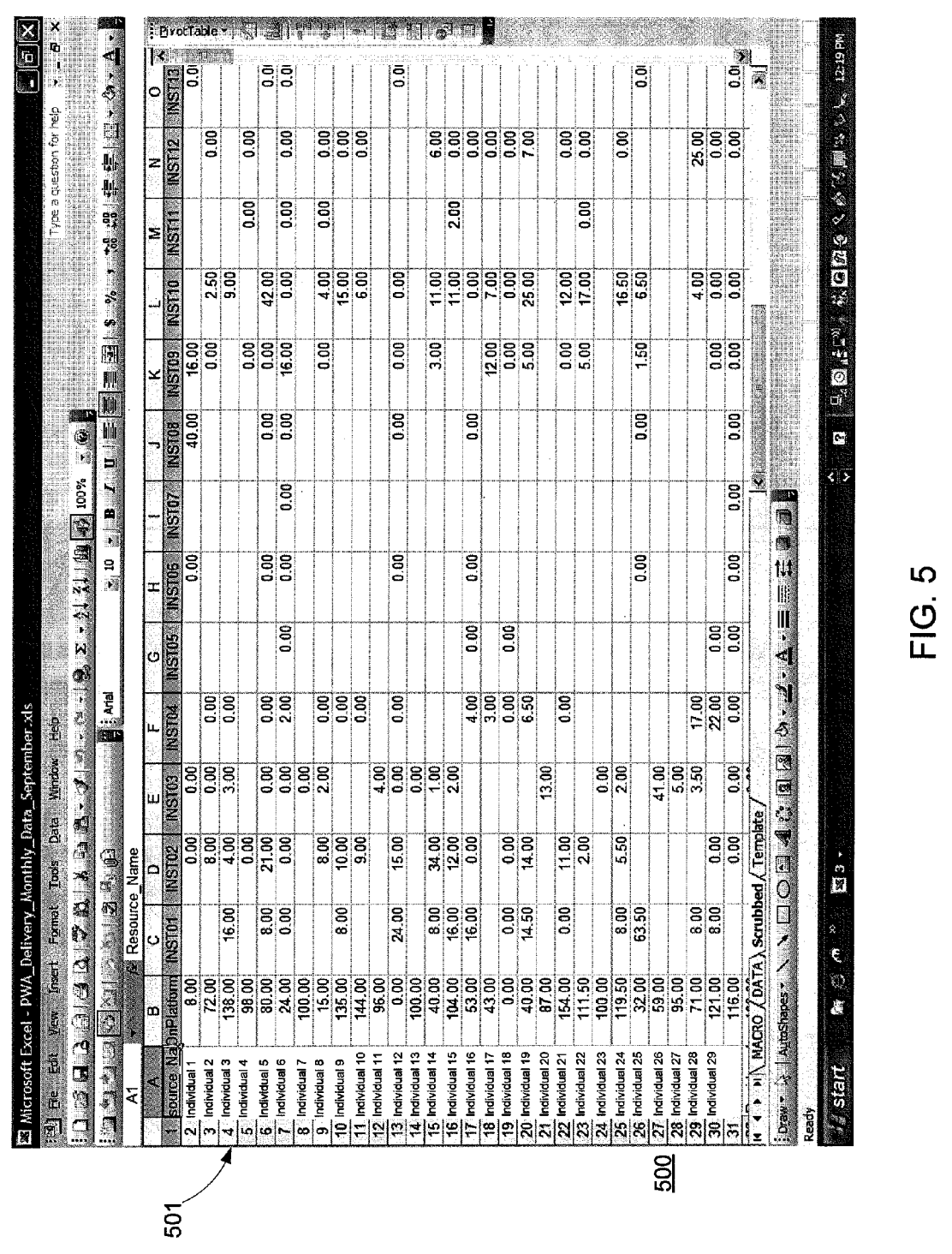
Figure 17:
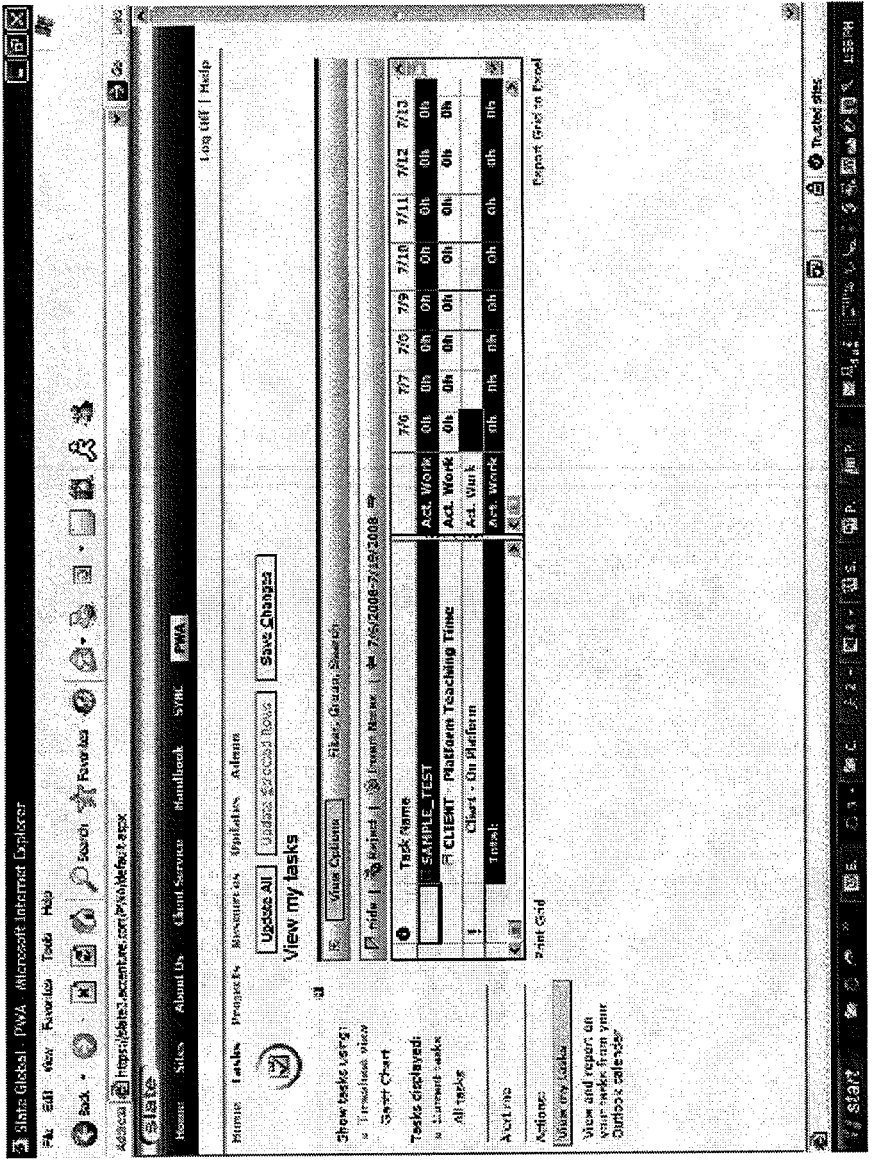
FIG. 17 shows a screenshot for providing resource logs into Internet Explorer® and accessing a timesheet in accordance with an embodiment of the invention.

FIG. 5 shows screenshot 500 in which data from a database is available for analysis in accordance with an embodiment of the invention. Screenshot 500 shows a spreadsheet with monthly time entries for different workers (individuals). With an embodiment of the invention, a worker submits an on-line timesheet, e.g., as shown in FIG. 17. For example, work (time) entry 501 is associated with a worker (individual 3) who charges 138 hours to work code on-platform, 16 hours to work code INST01, 4 hours to work code INST02, 3 hours to work code INST03, and 9 hours to work code INST10. Referring to entry 303 as shown in screenshot 300, the worker is associated to client 1 and consequently work code On-Platform is mapped to category A, work code INSTO2 is mapped to category E, and work code INST10 is mapped to category A.

Figure 10:
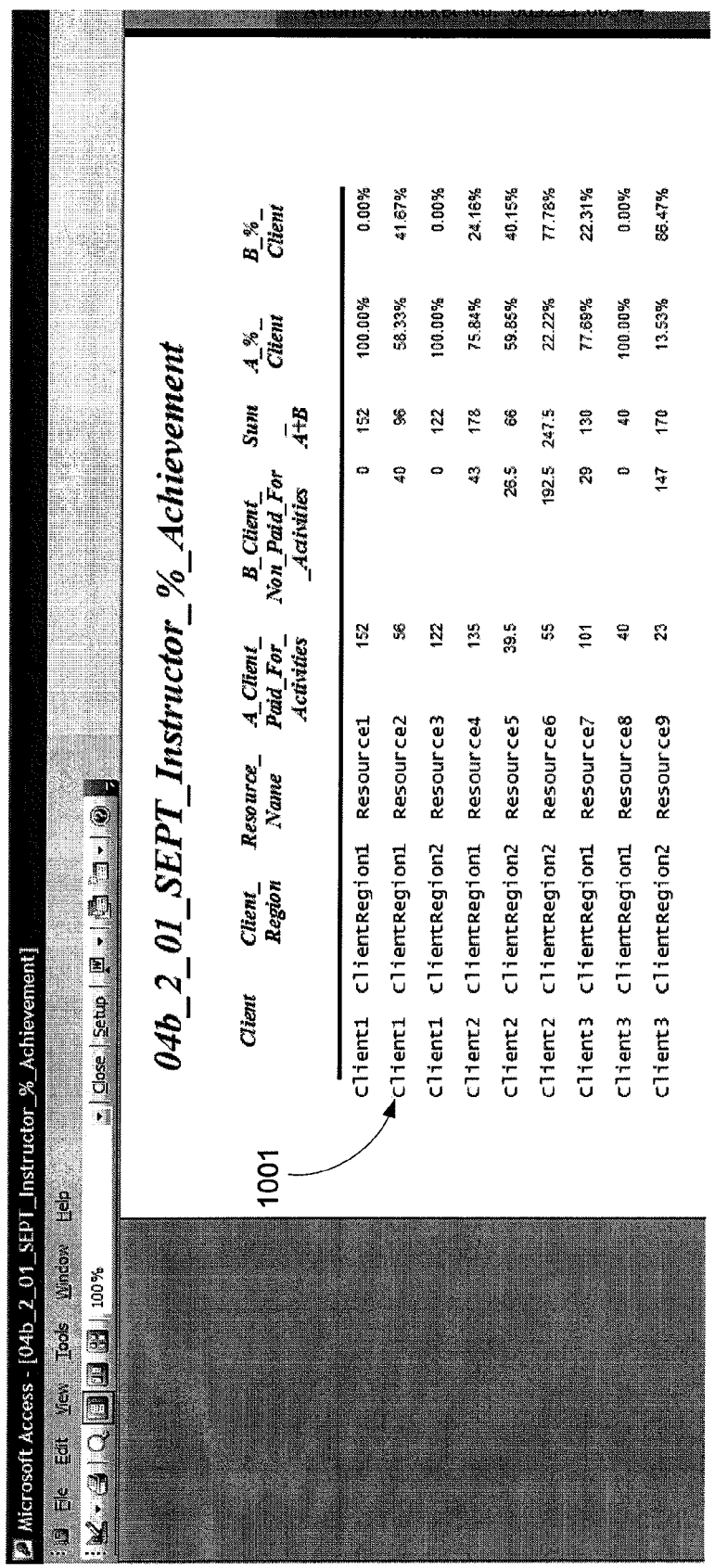
FIG. 10 shows a screenshot in which reports available through a graphical user interface in accordance with an embodiment of the invention.
Figure 11:
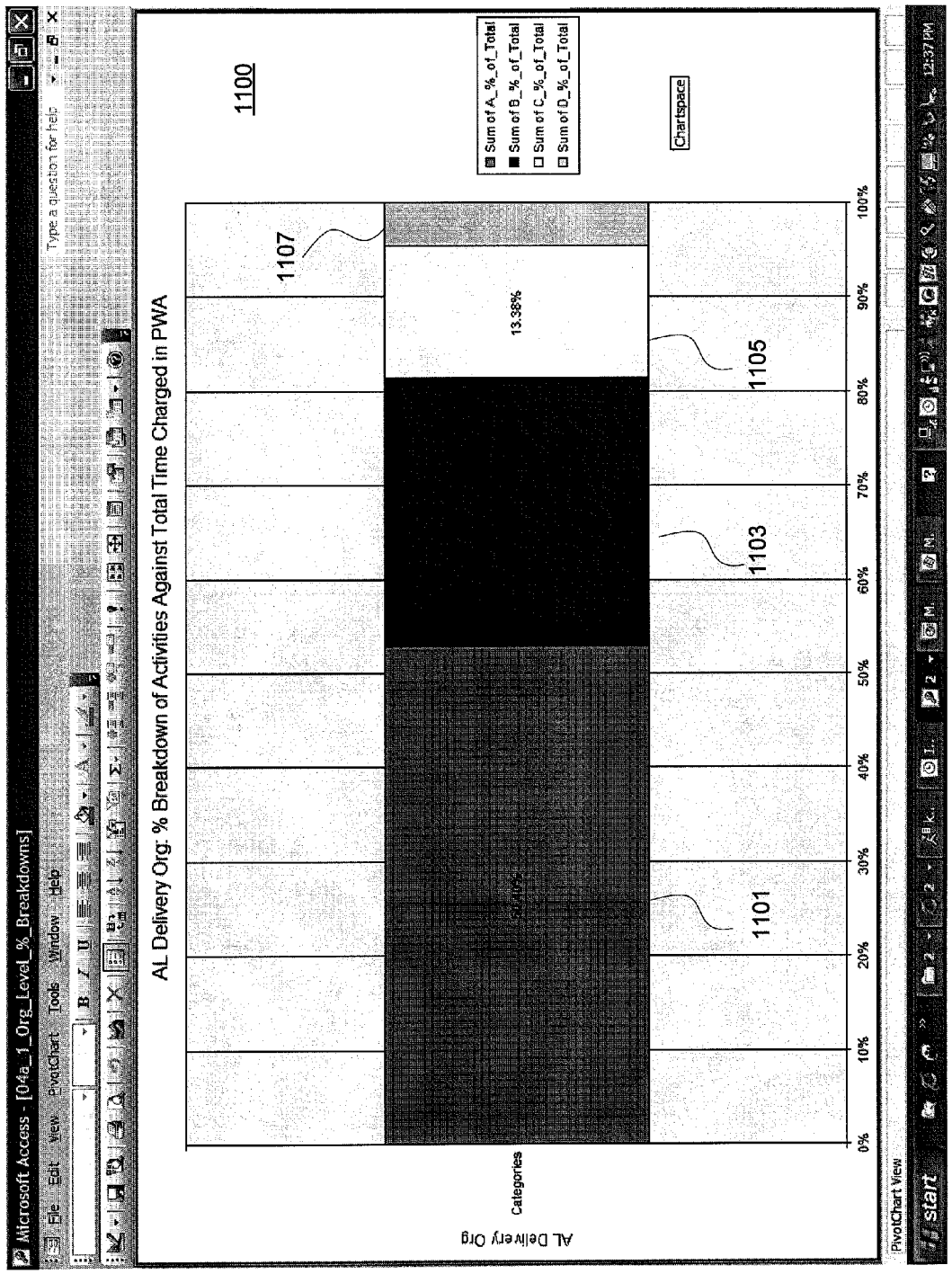
FIG. 11 shows a screenshot with a pivot chart report in accordance with an embodiment of the invention.

Referring to FIGS. 10 and 11, computer 100 may utilize rules, (e.g., as specified by screenshots 200 and 300) to generate reports for different clients and different workers. For example, as disclosed herein, a work efficiency for each worker may be determined. As another example, charged time (e.g., category A as shown in FIG. 11) may be determined as a percentage of the total time for an account.

Figure 36:
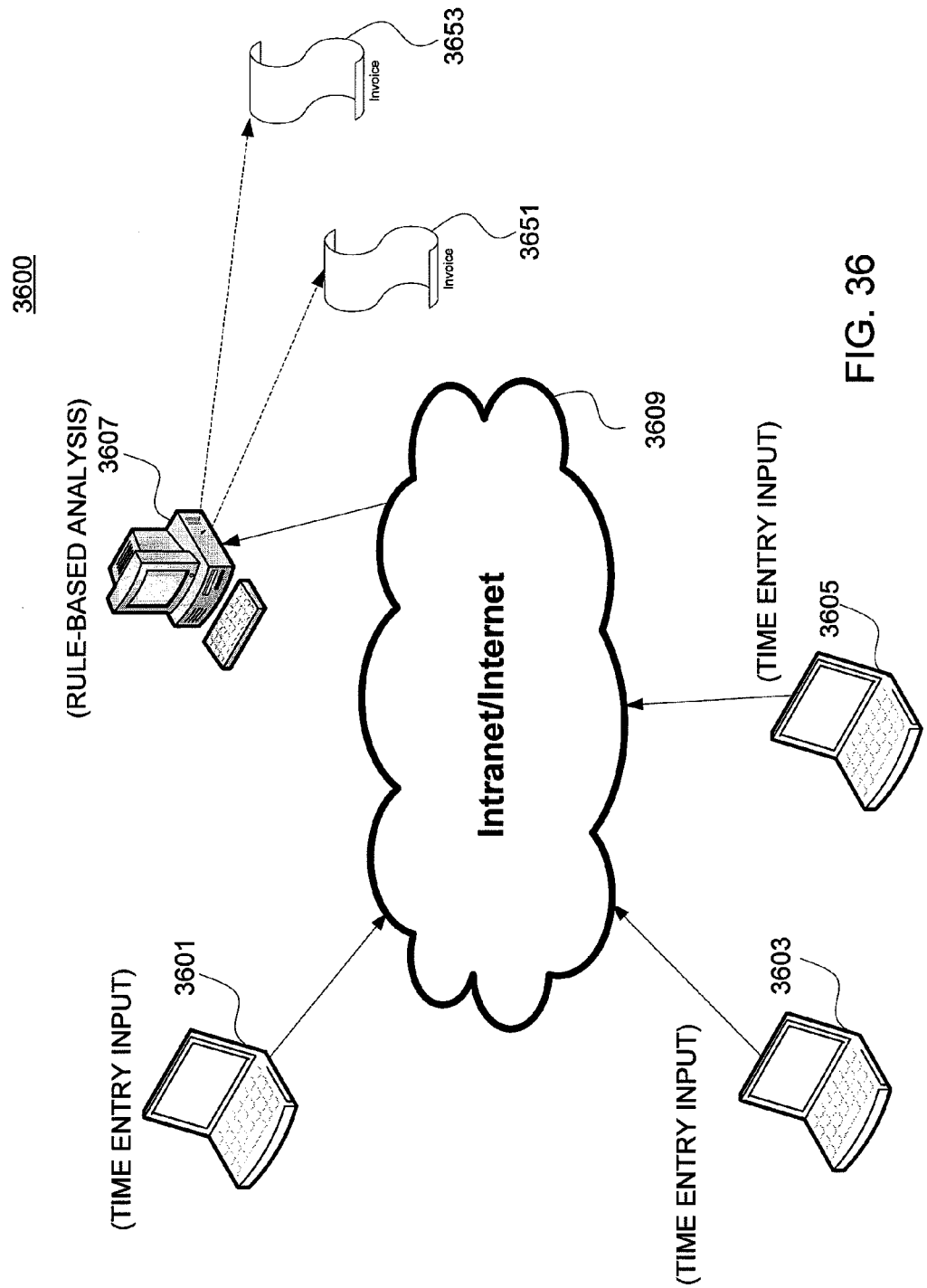
FIG. 36 shows a computer system that generates an invoice from work entries in accordance with an embodiment of the invention.

Referring to FIG. 36, computer 100 may utilize rules to generate invoices (bills) for accounts. Work entries for workers associated with an account are processed in which work (time) that is client paid is determined. For example, referencing screenshot 200, work that is associated with category A is billable to a client. However, different work codes may map to different categories in accordance with contractual obligations for different clients.

With an embodiment of the invention, linked spreadsheet files may be refreshed locally and macros may clean and format the linked data. The scrubbed data is directed to a PWA database, which is then available for categorization, analysis, and aggregation.

Figure 6:
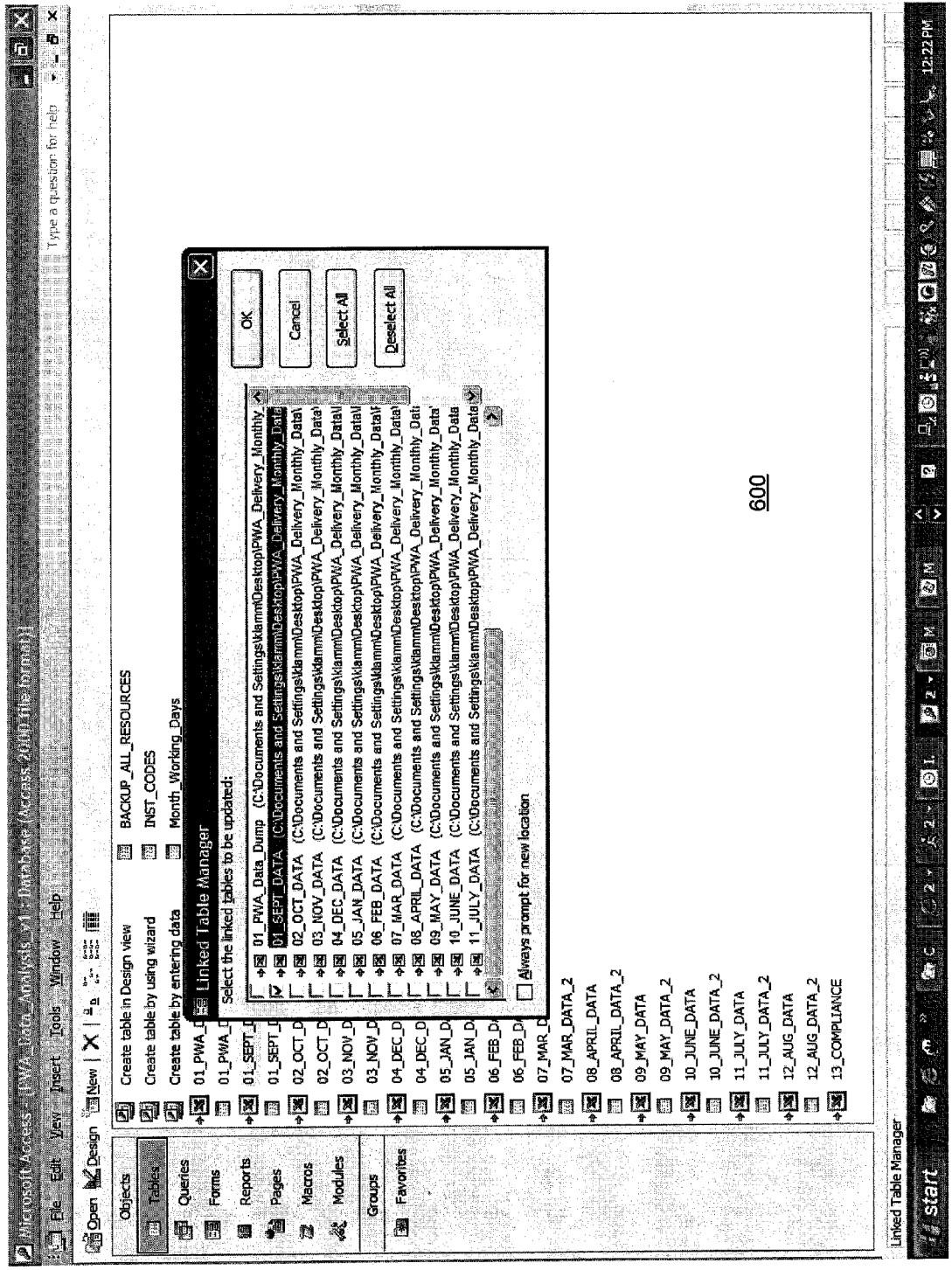
FIG. 6 shows a screenshot in which a database has tables that directly link to spreadsheet files in accordance with an embodiment of the invention.

FIG. 6 shows screenshot 600 in which a database has tables that directly link to spreadsheet files in accordance with an embodiment of the invention.

Figure 7:
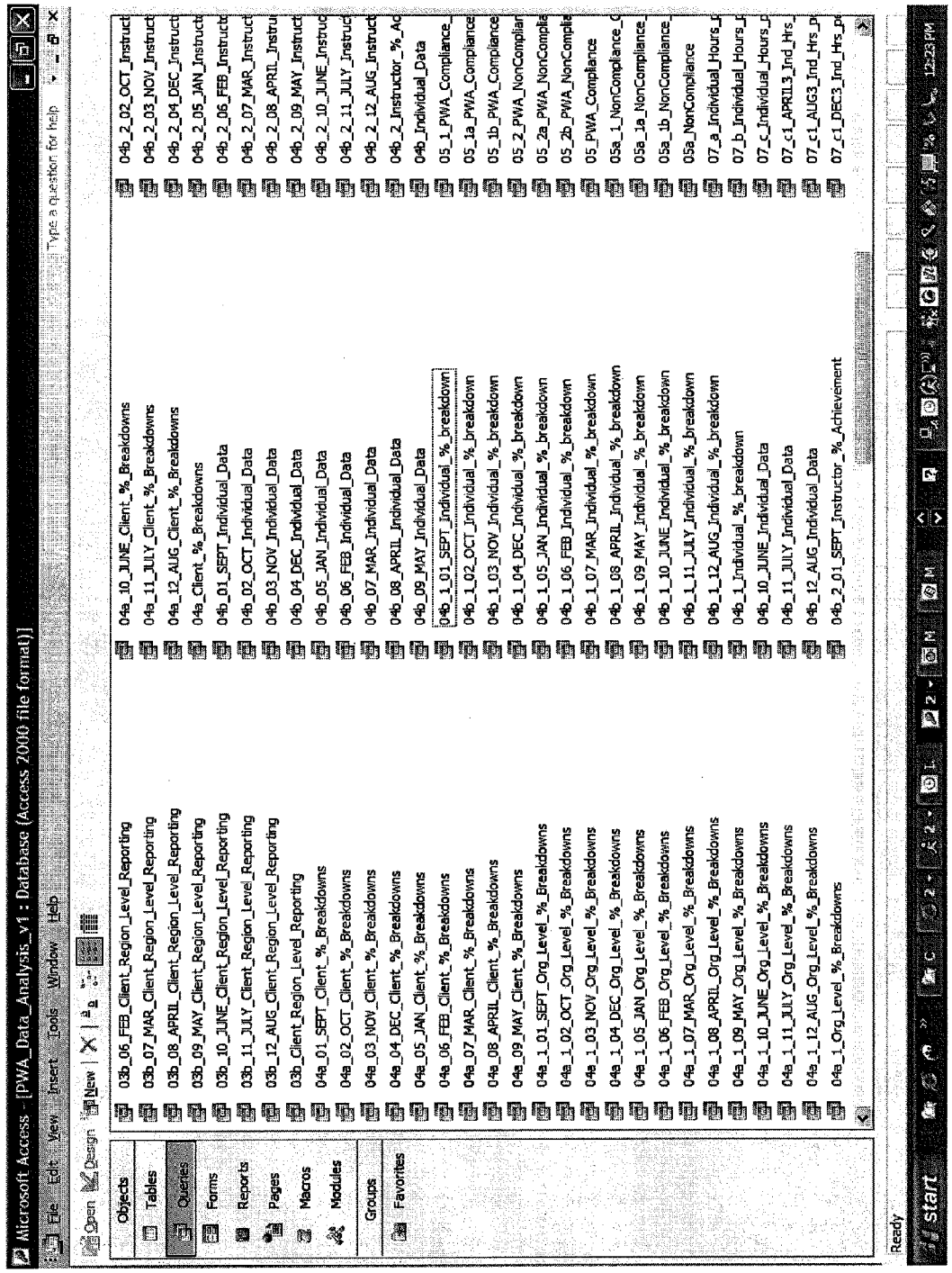
FIG. 7 shows a screenshot in which pre-built queries sort, group, and analyze in accordance with an embodiment of the invention.

FIG. 7 shows screenshot 700 in which pre-built queries sort, group, and analyze source data in accordance with an embodiment of the invention.

Figure 8:
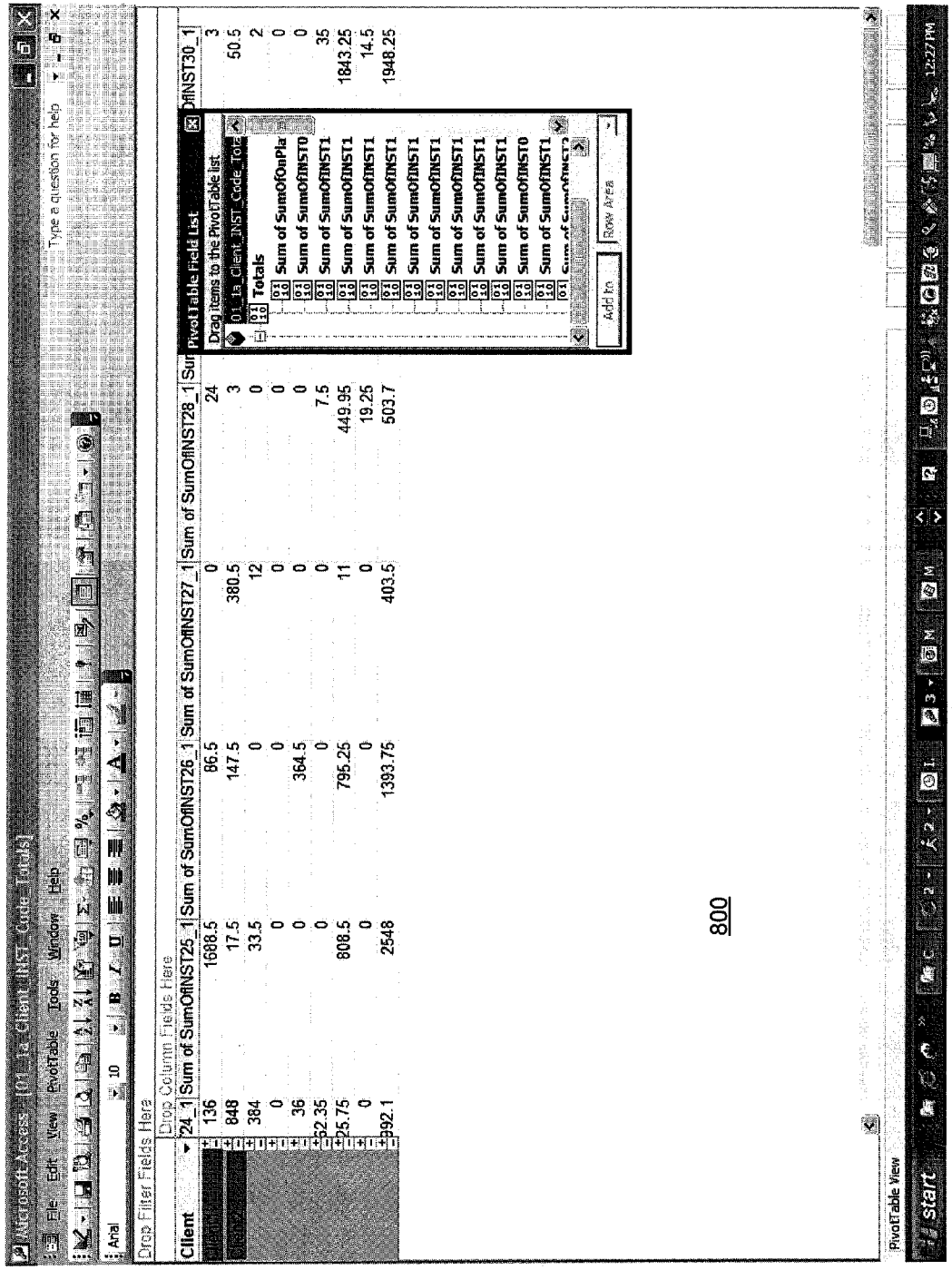
FIG. 8 shows a screenshot in which reports and pivot table forms are available for review in accordance with an embodiment of the invention.

FIG. 8 shows screenshot 800 in which reports and pivot table forms are available for review in accordance with an embodiment of the invention. As appreciated by one skilled in the art, a pivot table is a Microsoft Excel® feature that allows access to data that is organized into dimensions and measures. It acts as an OLAP client to allow users to interact with data stored in OLAP cubes using an Excel spreadsheet format.

Figure 9:
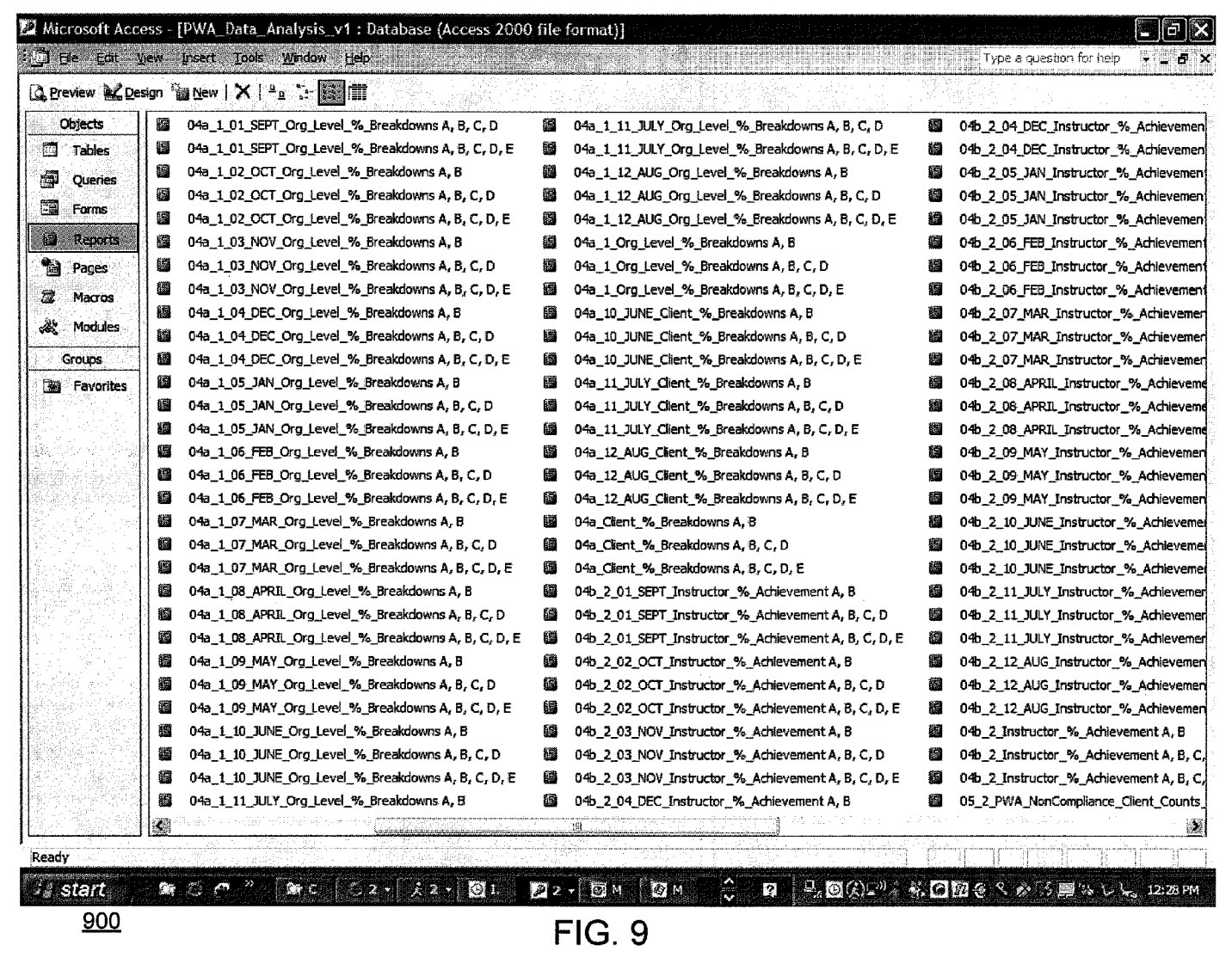

FIG. 9 shows screenshot 900 in which pre-built reports are available to provide a detailed analysis by organization, client, individual, and month in accordance with an embodiment of the invention.

FIG. 10 shows screenshot 1000 in which reports available through a graphical user interface in accordance with an embodiment of the invention. As shown in entry 1001, a worker (resource 2), who is assigned to an account (Client 1 and ClientRegion 1), has charged 56 hours that are mapped to category A and 40 hours that are mapped to category B. Consequently, an efficiency measure of the worker can be determined. For example, the efficiency may be specified as A/(A+B), which is equal to 58.33%.

FIG. 11 shows screenshot 1100 with a pivot chart report in accordance with an embodiment of the invention. Screenshot 1100 shows a breakdown of all hours charged for categories A, B, C, and D corresponding to regions 1101, 1103, 1105, and 1107, respectively. Screenshot 1100 may further provide a summary that indicates the efficiency of the organization. For example, an organization may set an objective that at least 60% of charged hours correspond to client paid time. If the actual time is less, the organization may decide to improve the efficiency of its workers or to re-negotiate the contract with the client.

FIG. 12 shows process flow 1200 between different software applications in accordance with an embodiment of the invention. The association with different screenshots is indicated with the different steps of process 1200.

Figure 13:
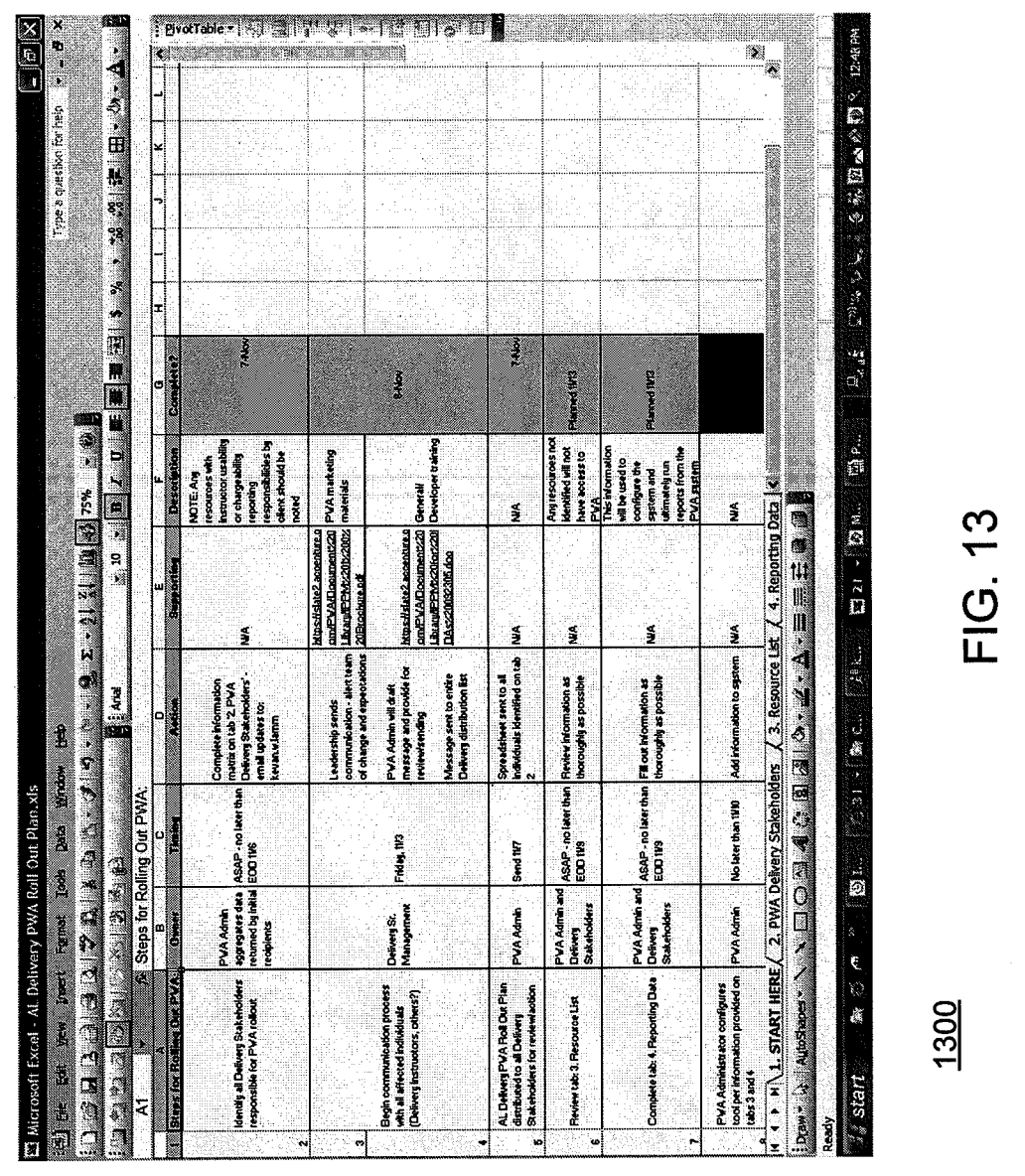

In step 1201, an organization collects requirements in accordance with a spreadsheet template as exemplified by screenshot 1300 in FIG. 13. As appreciated by one skilled in the art, a spreadsheet file may be provided by Microsoft Excel®, which is a proprietary spreadsheet application written and distributed by Microsoft Corporation for Microsoft Windows® and Mac OS X. It features calculation, graphing tools, and pivot tables.

Figure 14:
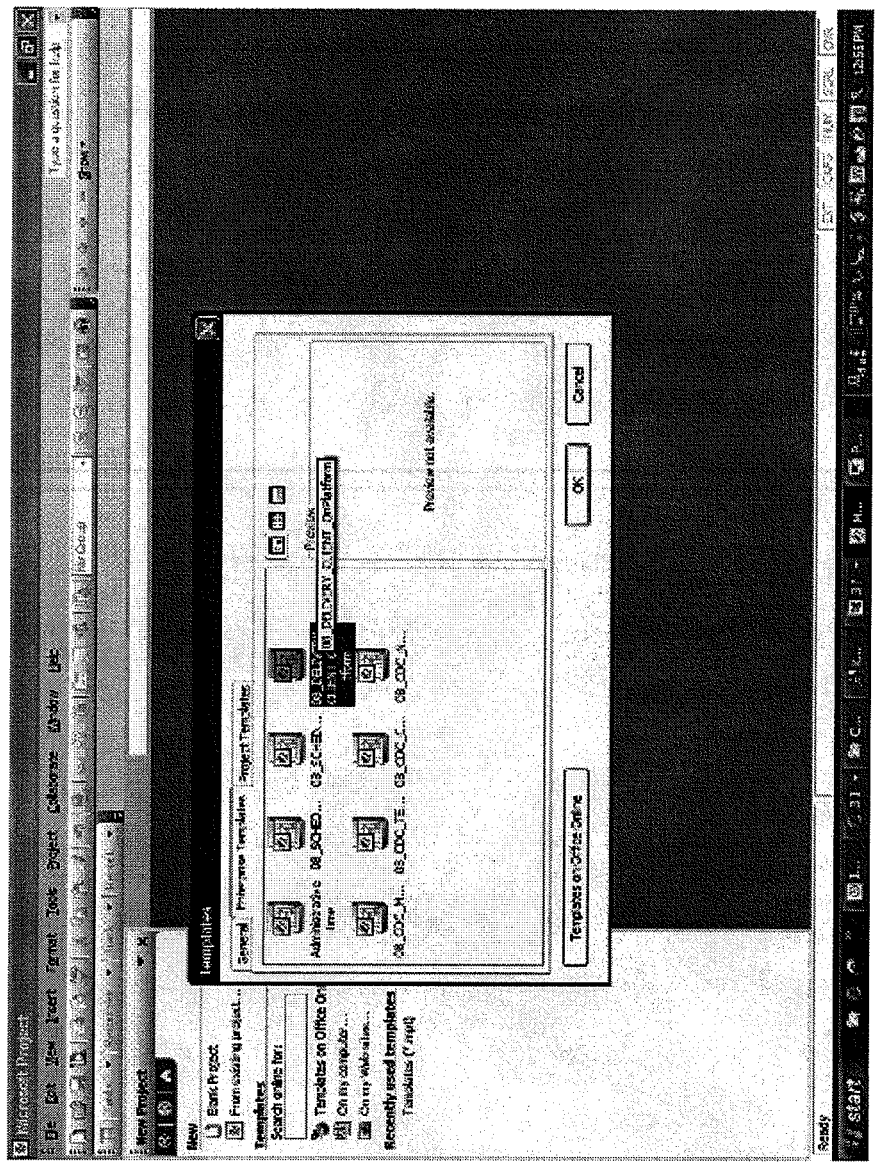
FIG. 14 shows a screenshot for building workplans via Microsoft Project® in accordance with an embodiment of the invention.

An organization then builds a workplan in step 1203 (corresponding to FIG. 14). With an embodiment of the invention, work plans are built with Microsoft Project®. Microsoft Project is a project management software program developed and sold by Microsoft Corporation that is designed to assist project managers in developing plans, assigning resources to tasks, tracking progress, managing budgets and analyzing workloads. Microsoft Project's capabilities are extended with the Microsoft Office Project Server and Microsoft Project Web Access. Project Server can store Project data in a central SQL-based database, allowing users to display and update this data over the Internet. Web Access allows authorized users to access a Project Server database across the Internet, and includes timesheets, graphical analysis of resource workloads, and administrative tools. Microsoft Office Project Server 2007 may be tightly integrated with Windows SharePoint Services, for each project is created in Project Workspace where the team members can share information related to Project.

Figure 15:
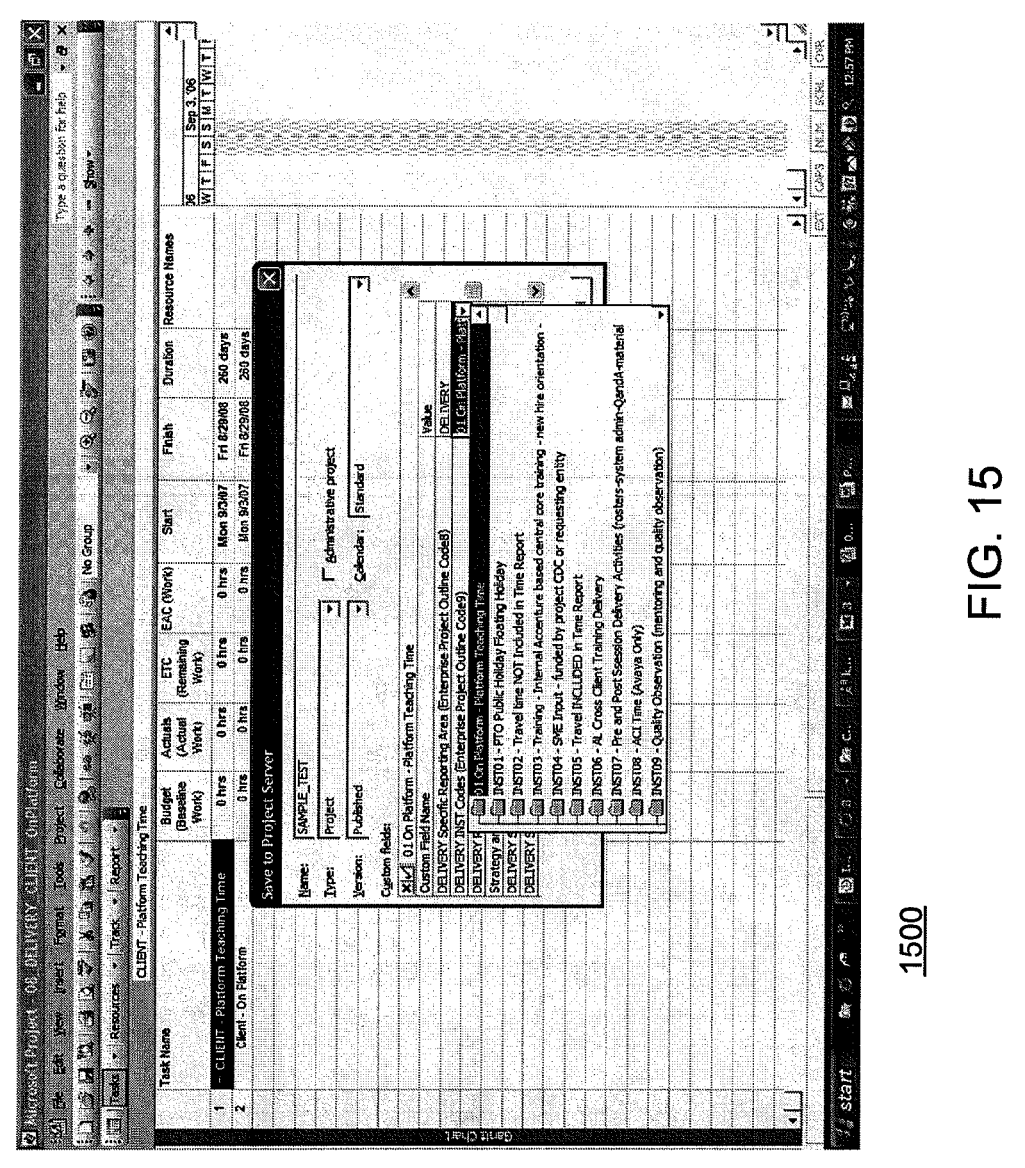

Metadata (e.g., specifying the work codes) is then set for the workplan in step 1205 as exemplified by screenshot 1500 in FIG. 15. Additional metadata may include contract information, fiscal year, specific reporting area (scheduling vs. instructors), delivery region, and INST codes. In step 1207 (corresponding to FIG. 16), workers (resources) are assigned to the workplan, and the workplan is published to a project server (e.g., a Microsoft PWA platform).

Workers enter work entries (timesheets) to charge time for actual work experience is typically entered through an on-line entry system, e.g., Microsoft Internet Explorer® web browser in step 1209 (corresponding to FIG. 17). In step 1211 (corresponding to FIG. 18), the time entries are updated and submitted for approval. An administrator can then accept the submitted entries in step 1213 (corresponding to FIG. 19). The approved entries are then written to a server in step 1215 (corresponding to FIG. 20), where data may be collected in a Microsoft SQL database.

In step 1217 (corresponding to FIG. 21) an On-Line Analytical Processing (OLAP) datacube collates entries from individual in report format. As appreciated by one skilled in the art, an OLAP cube is a data structure that can allow fast analysis of data. The term cube comes from the geometric object that has three dimensions. However, OLAP cubes can have many more dimensions than three, but the term continues to apply. Data analysis can occur in more than three dimensions (referred as a hypercube). For example, data may be analyzed using any of the following combinations: time, account, work code, individual, instructor global region, and category. This hypercube approach often allows for more accurate and customizable data analysis. The arrangement of data into cubes may overcome a limitation of relational databases. An OLAP cube is a specially designed database that is optimized for reporting. While most databases for online transaction processing are often designed for efficiency in data storage, OLAP cubes are typically designed for efficiency in data retrieval. This means that the data is stored in such a way as to make it easy and efficient for reporting. Typical relational databases treat all data into the database similarly. However, OLAP cubes categorize data into "dimensions" and "measures". Measures represent items that are counted, summarized or aggregated, such as costs or units of service. Dimensions are variables by which measures are summarized. This organization of data can facilitate the ability to formulate data requests. In addition, many of queries that could be posed to the data are pre-aggregated in the database such that the answers have already been pre-calculated and can be reported without substantial delay.

In step 1219 (corresponding to FIG. 22), a spreadsheet file is linked to the OLAP cube. A local spreadsheet queries the OLAP cube (database) and ports data to local spreadsheet. In step 1221 (corresponding to FIG. 23), OLAP data is scrubbed and formatted in accordance with macros. In step 1223 (corresponding to FIG. 24), a database synchronizes the scrubbed spreadsheet output. With an embodiment of the invention, a Microsoft Access™ database links to a local Excel file using internal refresh and uses data as a table.

In step 1225 (corresponding to FIGS. 25, 2, 3, 26, 27, and 28), the data in the database is categorized, analyzed, and aggregated. With an embodiment of the invention, multiple data tables in the Microsoft Access database allow the administrator to modify resource (and account level) characteristics (client paid for activity, load activity, tracking activity, etc.) and categories.

Figure 33:
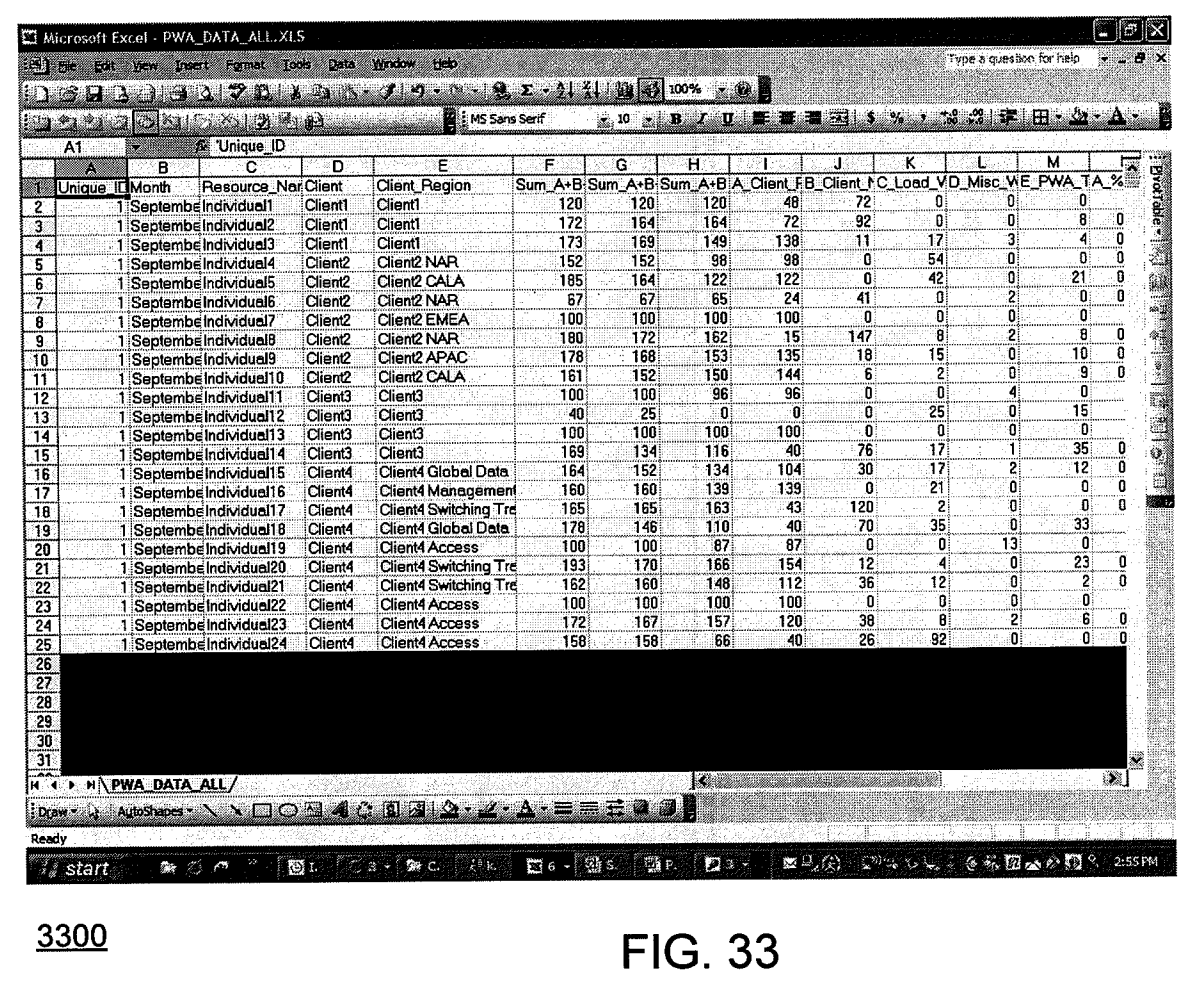

In step 1227 (corresponding to FIGS. 29-32) queries combine and aggregate data tables into cohesive reports (organization level data) and are exported as spreadsheet results in step 1229 (corresponding to FIG. 33).

In step 1231 (corresponding to FIG. 34), spreadsheet reports are uploaded to pre-built Microsoft SharePoint® forms. As appreciated by one skilled in the art, Microsoft SharePoint is a browser-based collaboration and document management platform from Microsoft Corporation. It can be used to host web sites that access shared workspaces and documents, as well as specialized applications like wikis and blogs from a browser. The Microsoft SharePoint form is available to select groups based on organization level taxonomy structure created using Microsoft Exchange functionality.

In step 1235 (corresponding to FIG. 35), final output from data analysis is available in Microsoft PowerPoint® format on a periodic (e.g., monthly) and ad hoc basis. The reports can provide an analysis across workers and accounts.

FIGS. 13-35 show additional screenshots in accordance with aspects of the invention.

FIG. 13 shows screenshot 1300 for collecting requirements via a spreadsheet template in accordance with an embodiment of the invention.

FIG. 14 shows screenshot 1400 for building workplans via Microsoft Project® in accordance with an embodiment of the invention.

FIG. 15 shows screenshot 1500 for setting metadata for Project Plan in accordance with an embodiment of the invention.

Figure 16:
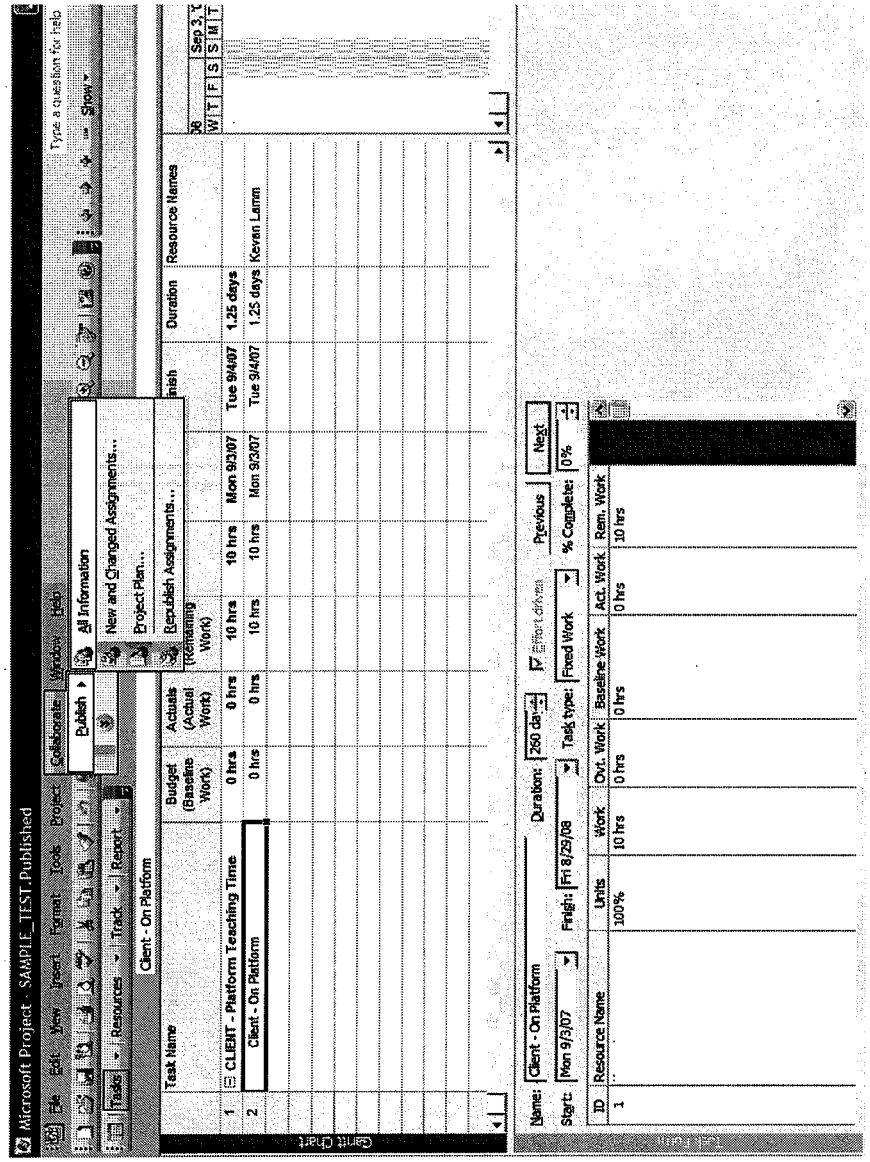
FIG. 16 shows a screenshot for assigning resources and publishing a workplan to a project server in accordance with an embodiment of the invention.

FIG. 16 shows screenshot 1600 for assigning resources and publishing a workplan to a project server in accordance with an embodiment of the invention.

FIG. 17 shows screenshot 1700 for providing resource logs into Internet Explorer and accessing a timesheet in accordance with an embodiment of the invention.

Figure 18:
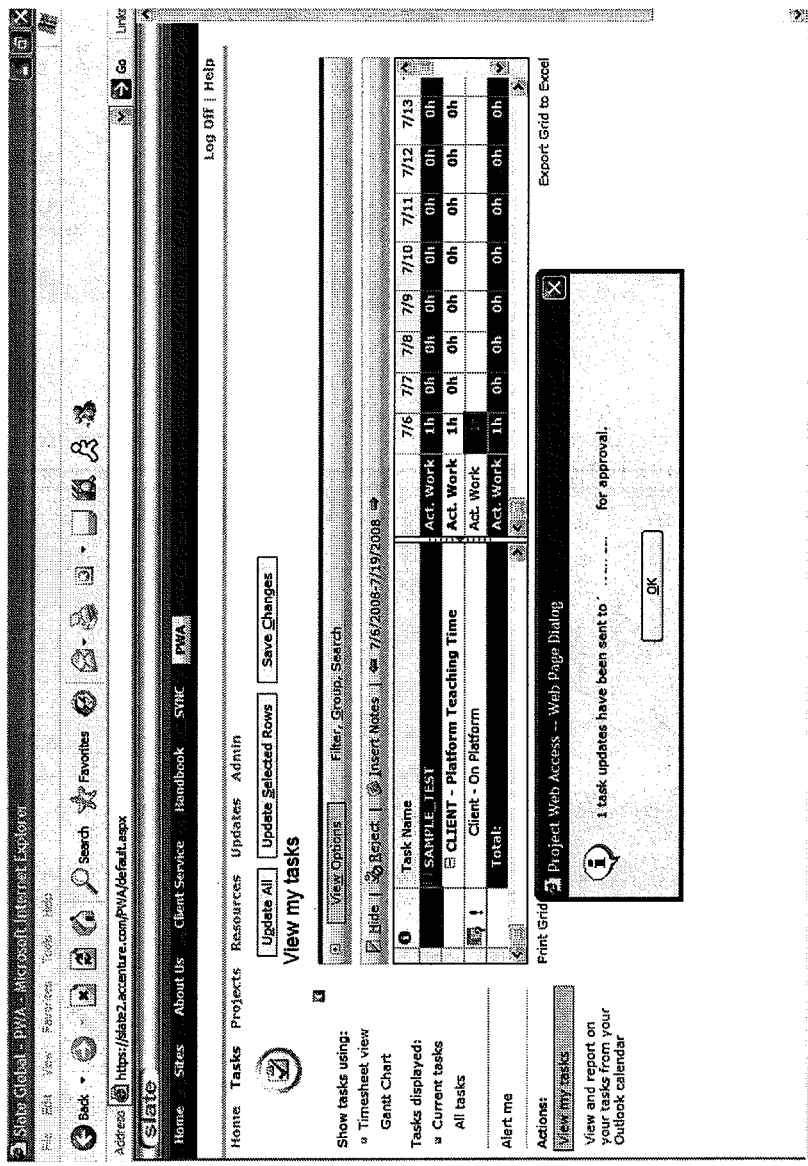
FIG. 18 shows a screenshot for entering updates and submitting for approval in accordance with an embodiment of the invention.

FIG. 18 shows screenshot 1800 for entering updates and submitting for approval in accordance with an embodiment of the invention.

Figure 19:
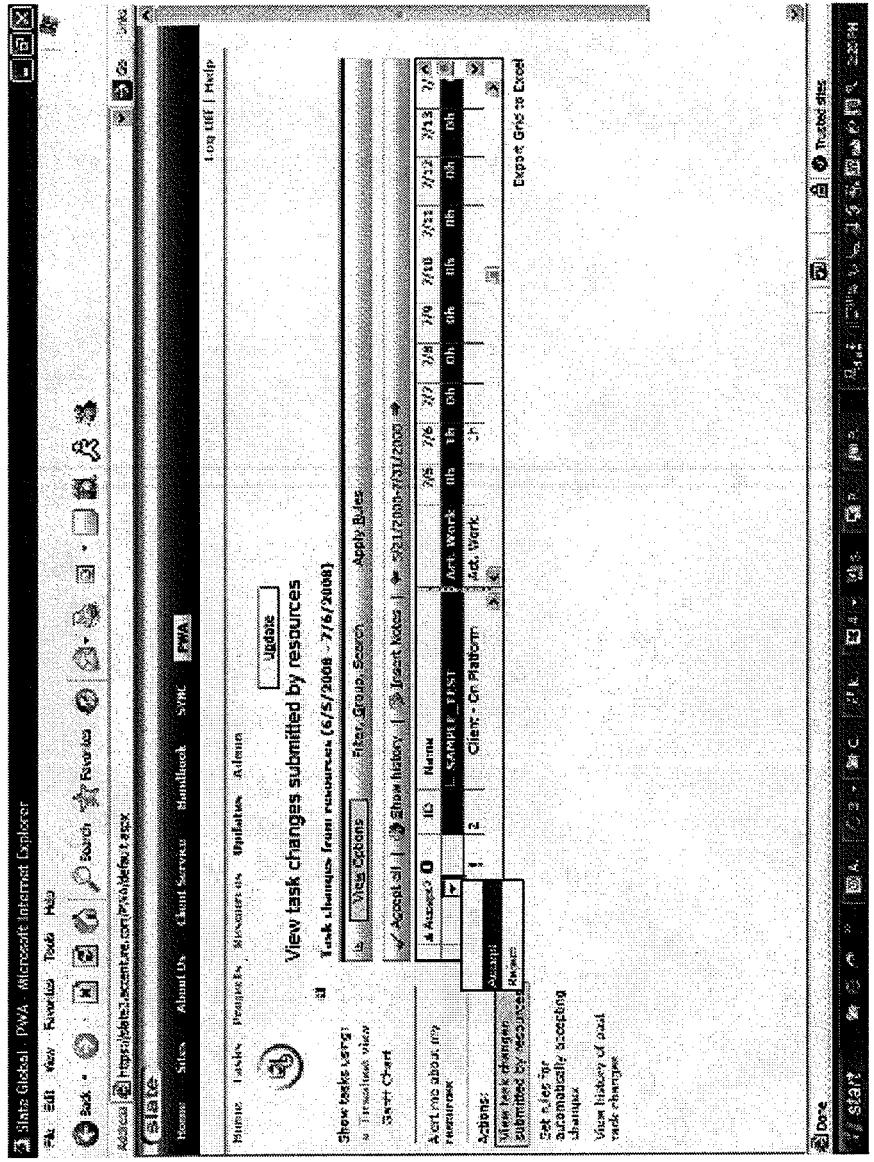
FIG. 19 shows a screenshot when an administrator accepts updates in accordance with an embodiment of the invention.

FIG. 19 shows screenshot 1900 when an administrator accepts updates in accordance with an embodiment of the invention.

Figure 20:
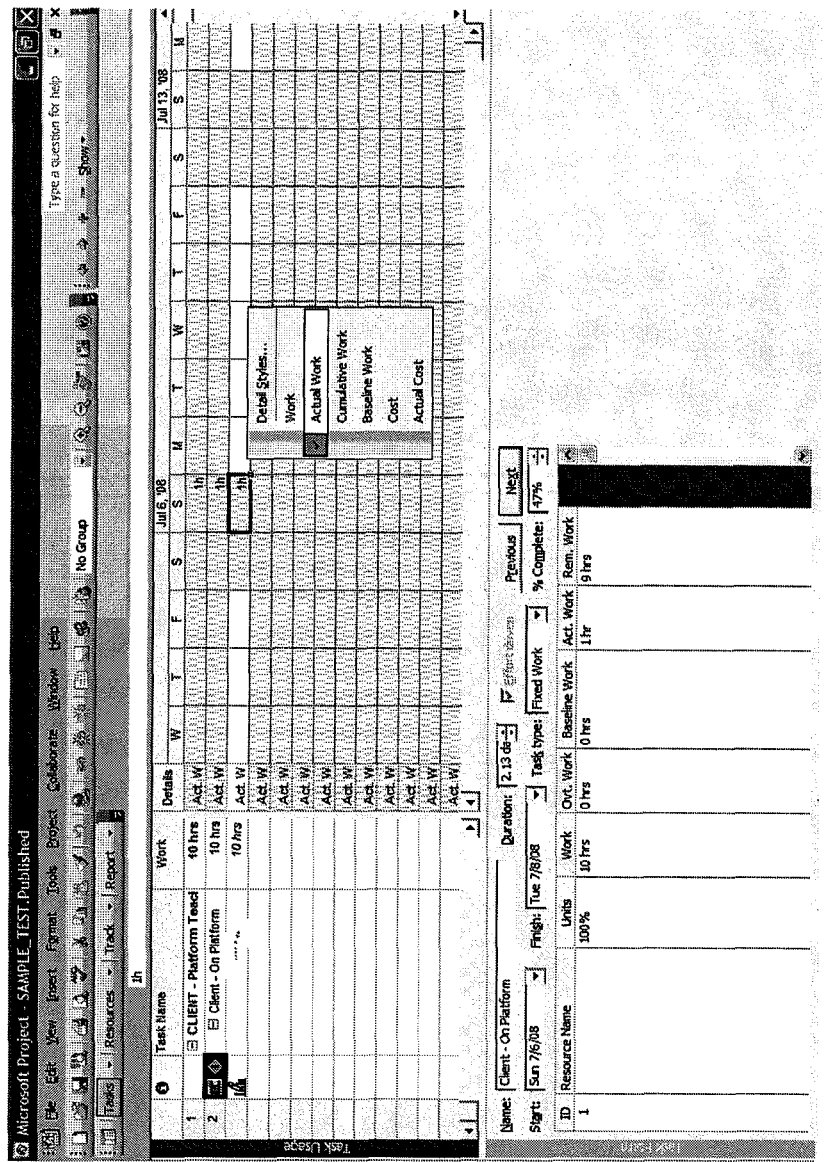
FIG. 20 shows a screenshot for updates written to a project plan on a server in accordance with an embodiment of the invention.

FIG. 20 shows screenshot 2000 for updates written to a project plan on a server in accordance with an embodiment of the invention.

Figure 21:
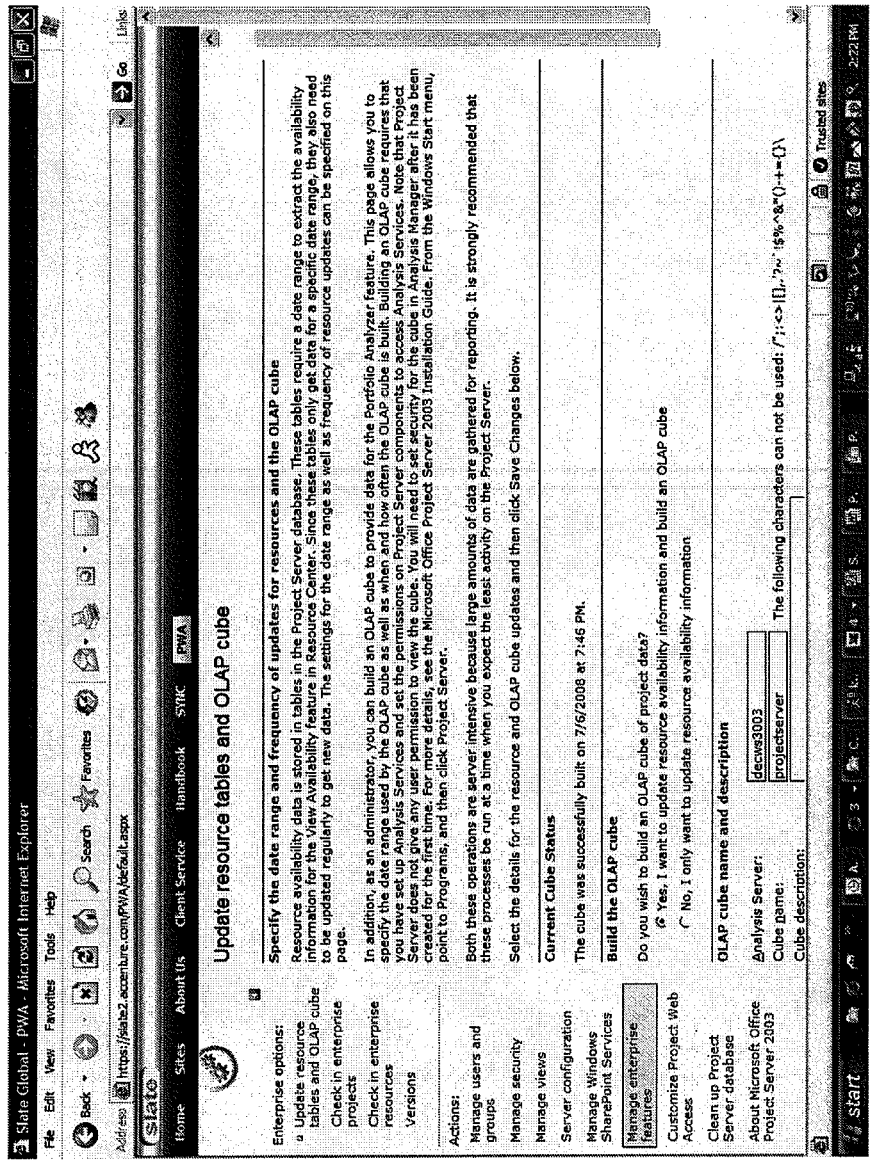
FIG. 21 shows a screenshot in which an Microsoft SQL On-Line Analytical Processing (OLAP) Cube build nightly incorporating any updates in accordance with an embodiment of the invention.

FIG. 21 shows screenshot 2100 in which a Microsoft SQL OLAP Cube build nightly incorporating any updates in accordance with an embodiment of the invention.

Figure 22:
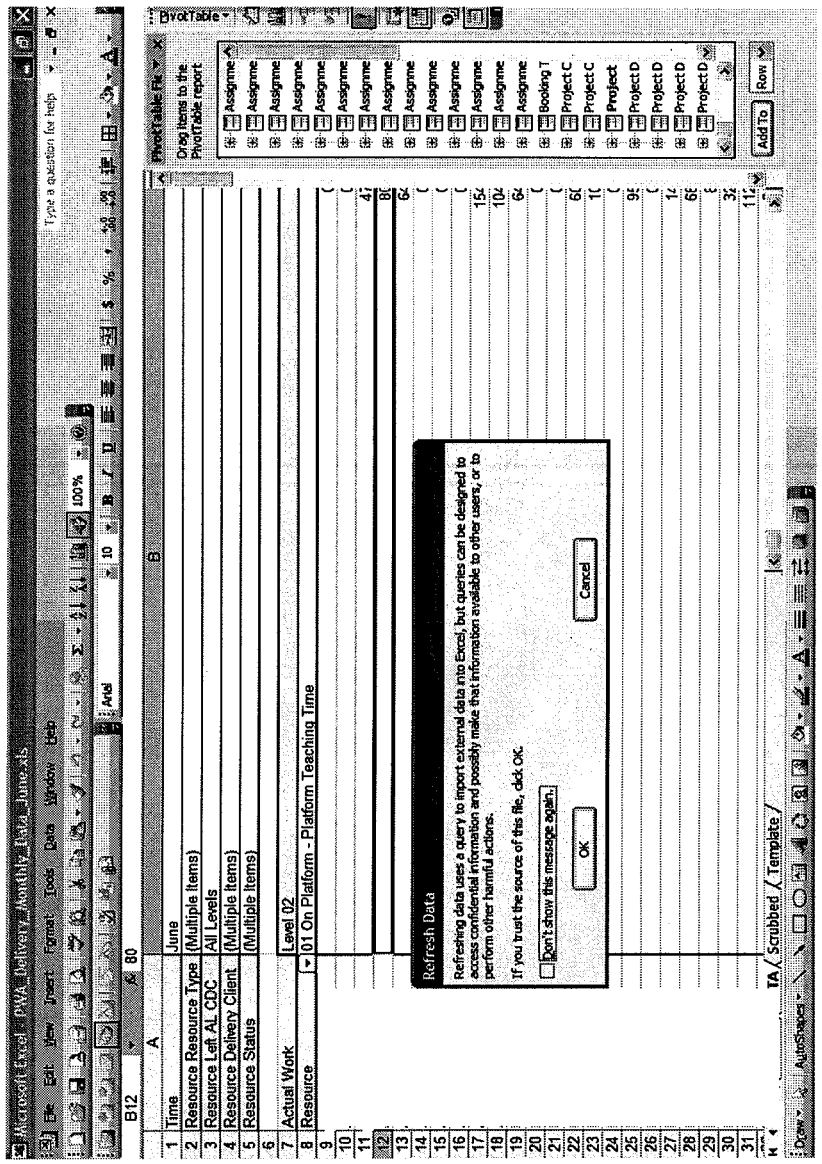
FIG. 22 shows a screenshot in which spreadsheet links to OLAP cube in accordance with an embodiment of the invention.

FIG. 22 shows screenshot 2200 in which a spreadsheet file links to OLAP cube in accordance with an embodiment of the invention.

Figure 23:
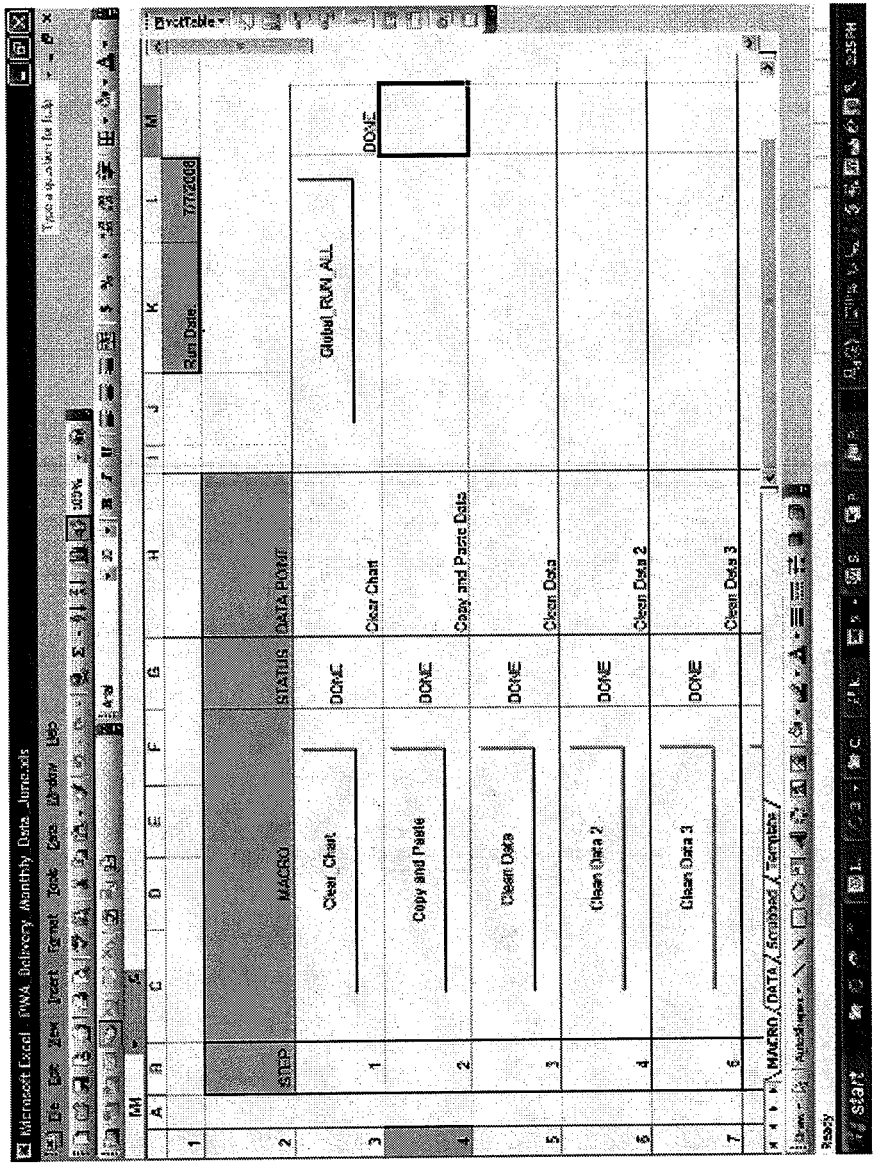
FIG. 23 shows a screenshot in which refreshed OLAP data being scrubbed and formatted per macros in accordance with an embodiment of the invention.

FIG. 23 shows screenshot 2300 in which refreshed OLAP data being scrubbed and formatted per macros in accordance with an embodiment of the invention.

Figure 24:
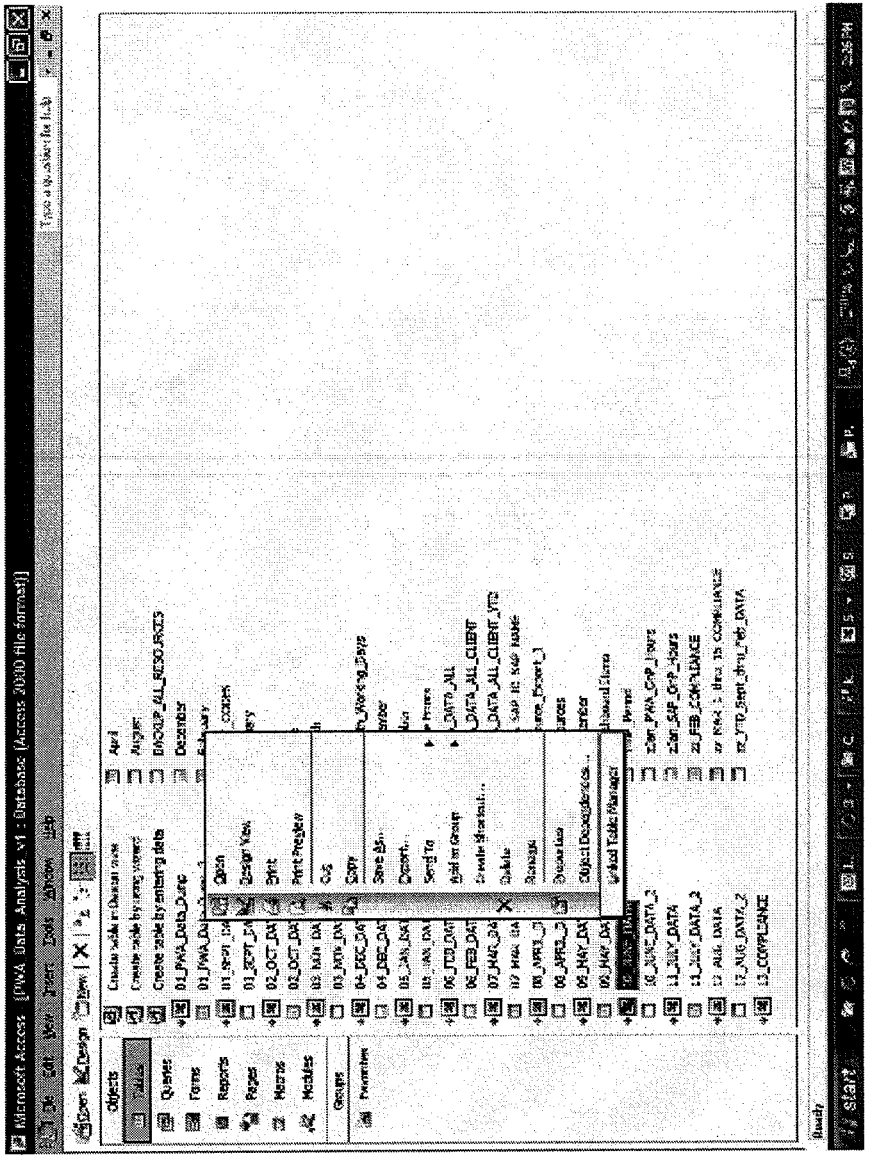
FIG. 24 shows a screenshot in which a Microsoft Access™ database synchronizing with scrubbed spreadsheet output in accordance with an embodiment of the invention.

FIG. 24 shows screenshot 2400 in which a Microsoft Access database synchronizing with a scrubbed spreadsheet output in accordance with an embodiment of the invention.

Figure 25:
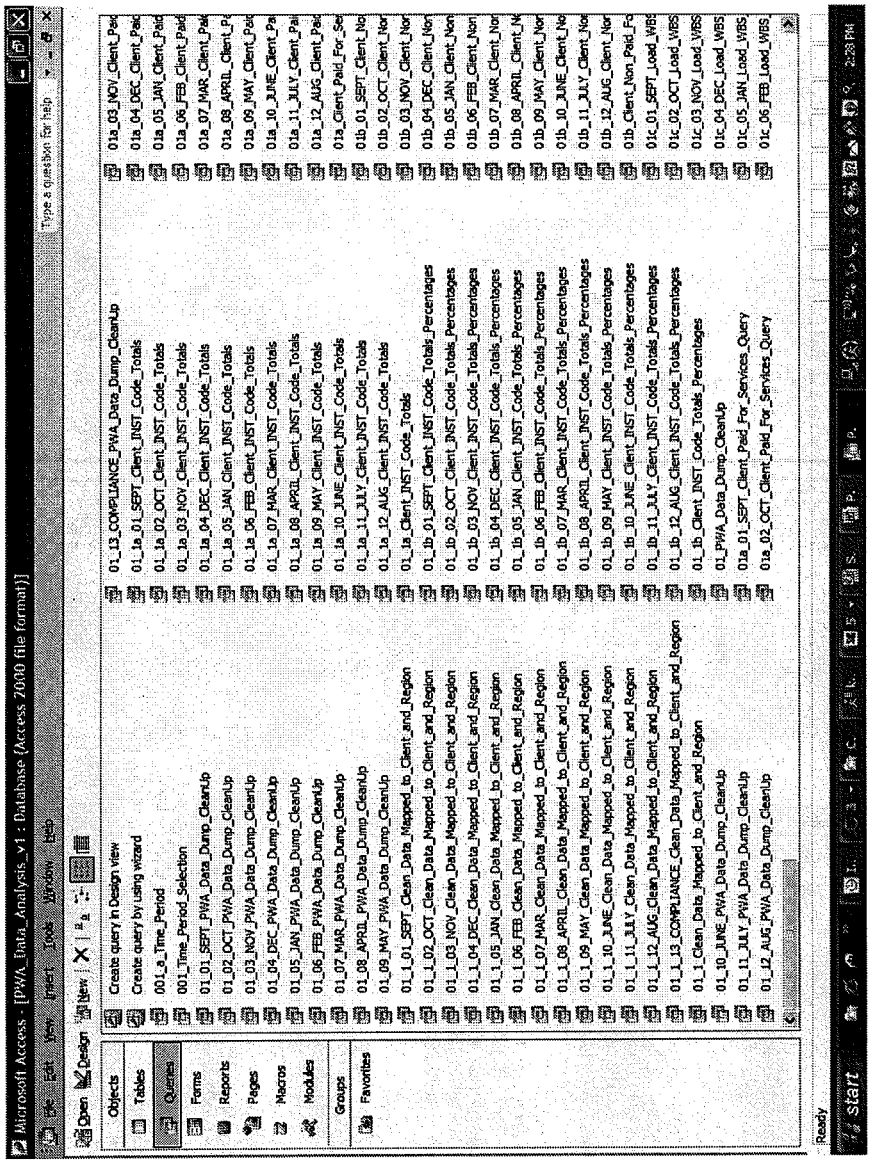
FIG. 25 shows a screenshot in which imported data being analyzed using a series of building queries in accordance with an embodiment of the invention.

FIG. 25 shows screenshot 2500 in which imported data being analyzed using a series of building queries in accordance with an embodiment of the invention.

Figure 26:
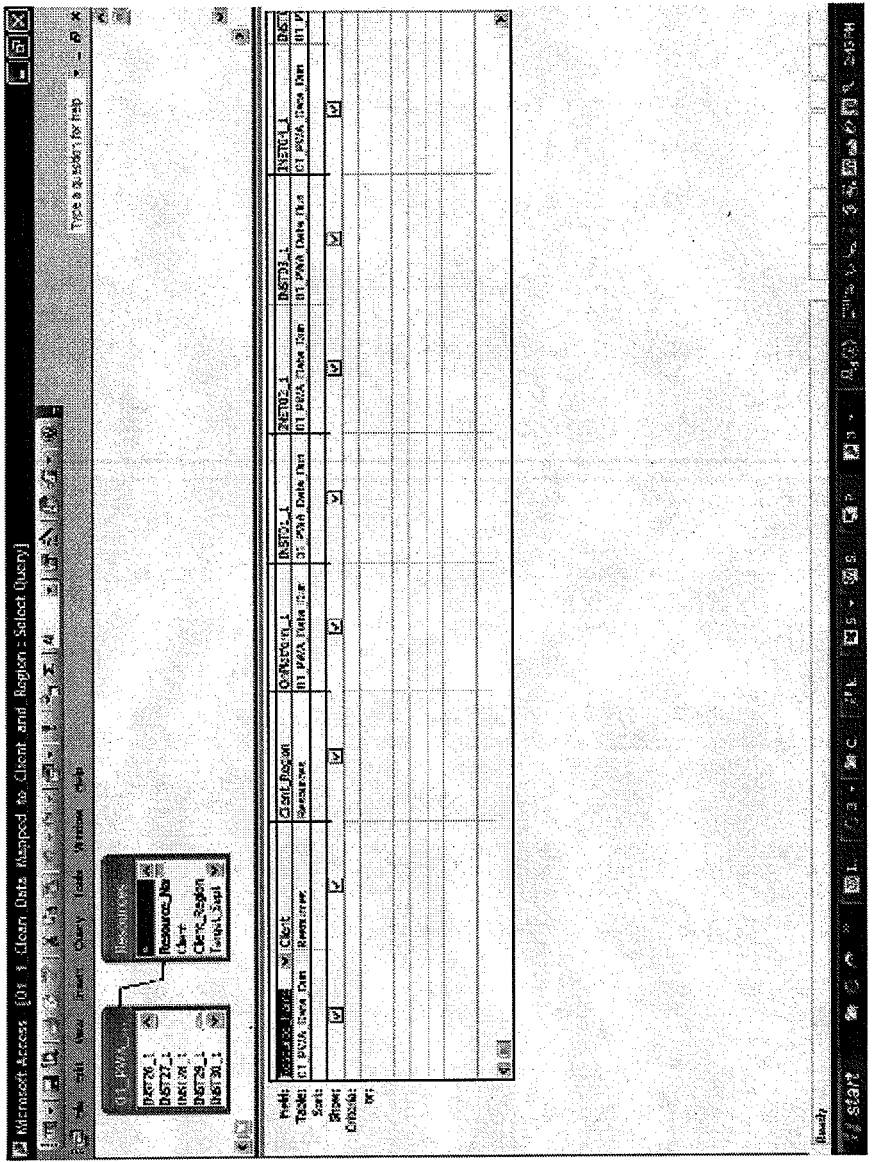
FIG. 26 shows a screenshot in which queries that map individuals to clients as well as codes in accordance with an embodiment of the invention.

FIG. 26 shows screenshot 2600 in which queries that map individuals to clients as well as codes in accordance with an embodiment of the invention.

Figure 27:
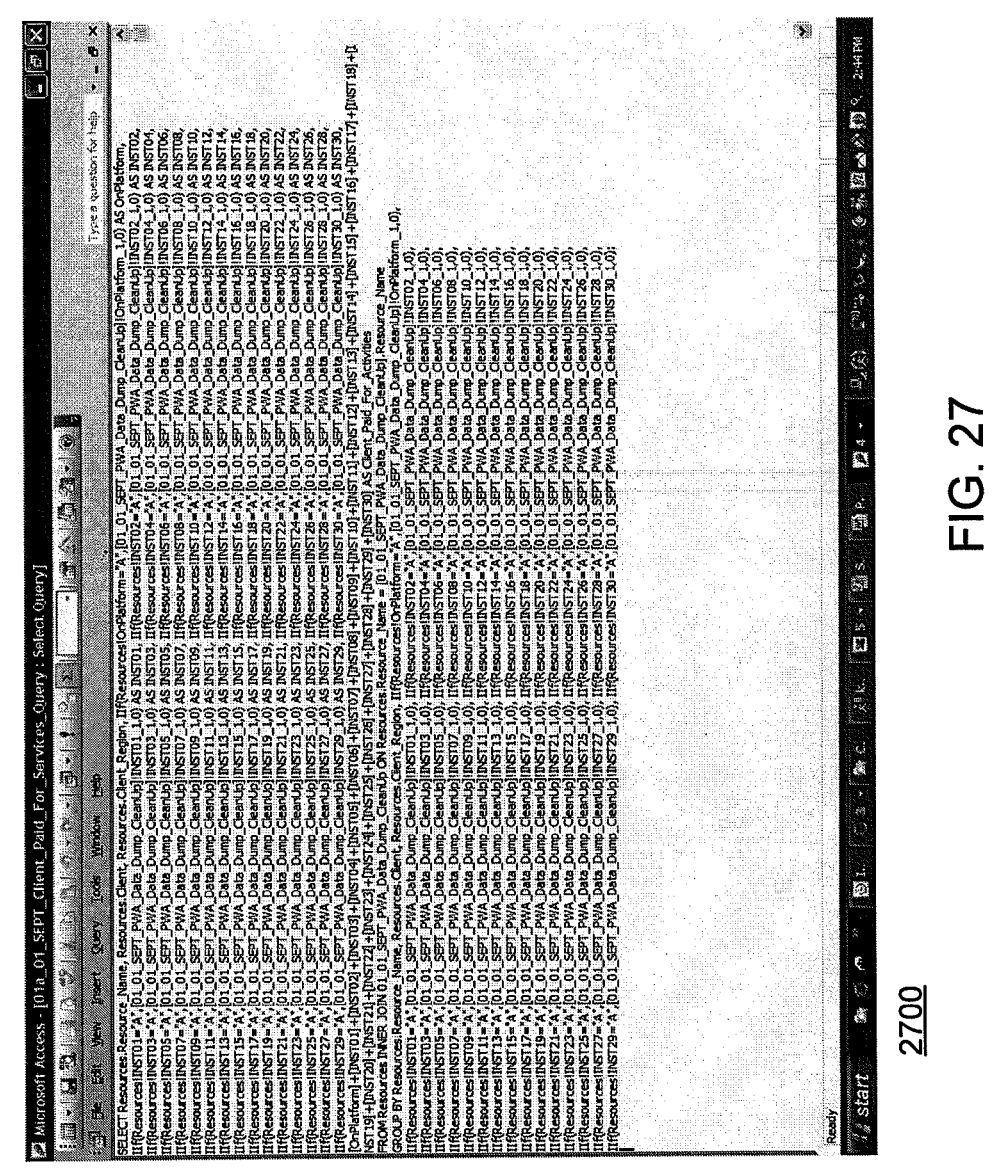

FIG. 27 shows screenshot 2700 in which each time period (month) being analyzed by individual and category using SQL statement in accordance with an embodiment of the invention.

Figure 28:
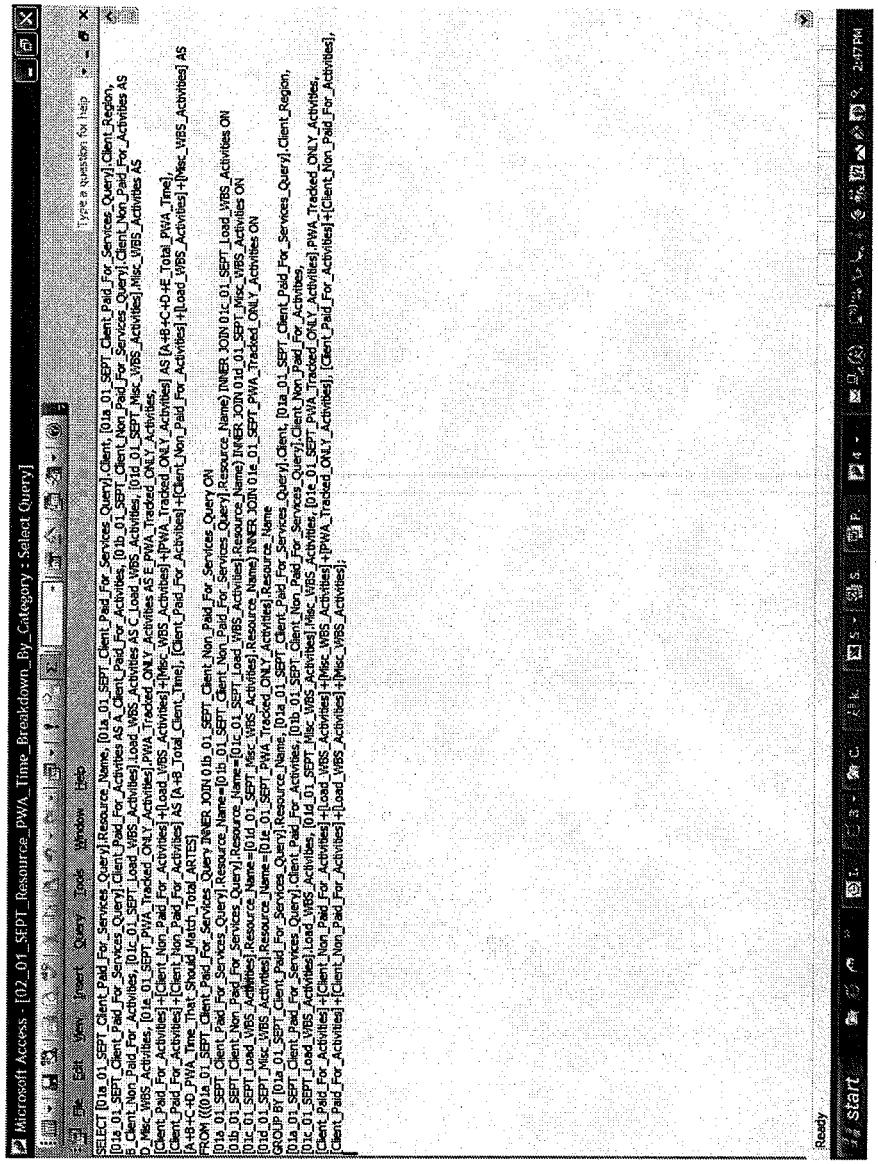
FIG. 28 shows a screenshot of an aggregation of results of categories in accordance with an embodiment of the invention.

FIG. 28 shows screenshot 2800 which is an aggregation of results of categories in accordance with an embodiment of the invention.

Figure 29:
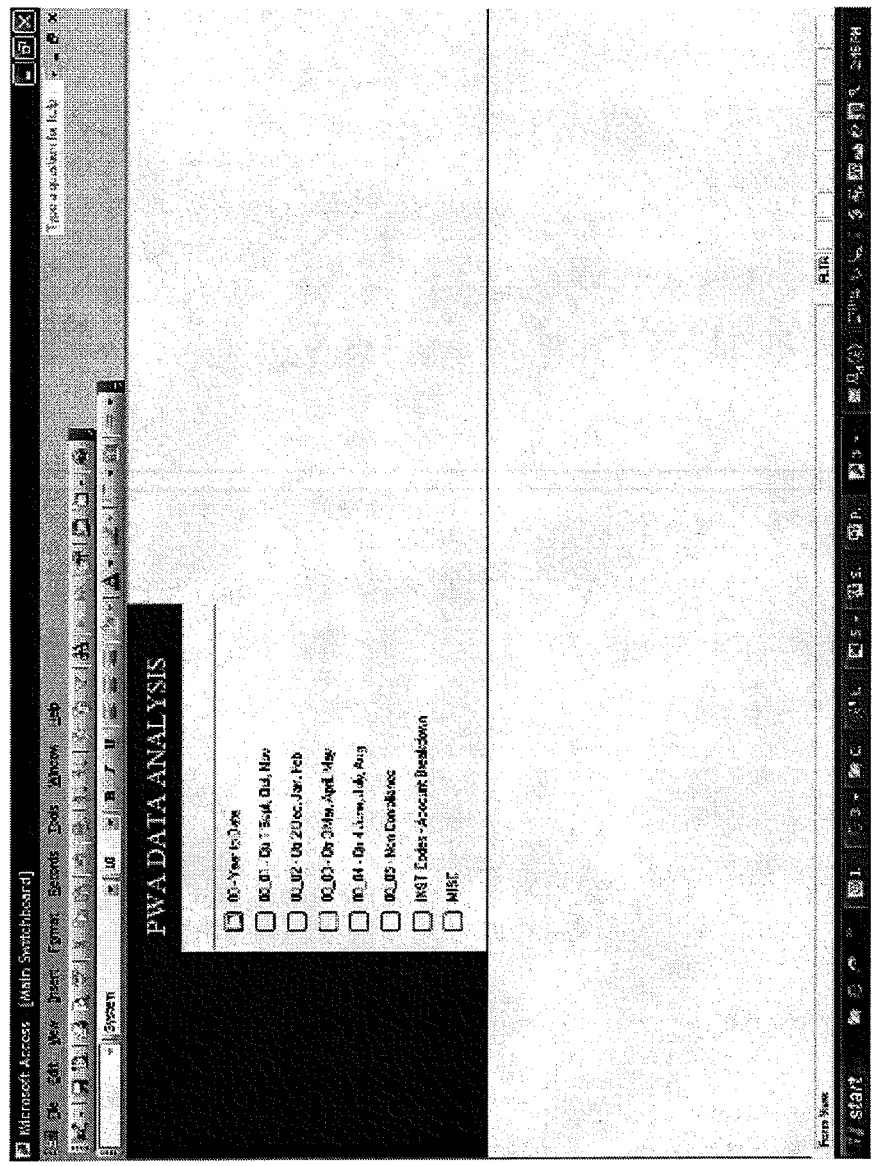
FIG. 29 shows a screenshot in which results of queries and category/code analysis available in pre-built reports accessed through a switchboard in accordance with an embodiment of the invention.

FIG. 29 shows screenshot 2900 in which results of queries and category/code analysis available in pre-built reports accessed through a switchboard in accordance with an embodiment of the invention.

Figure 30:
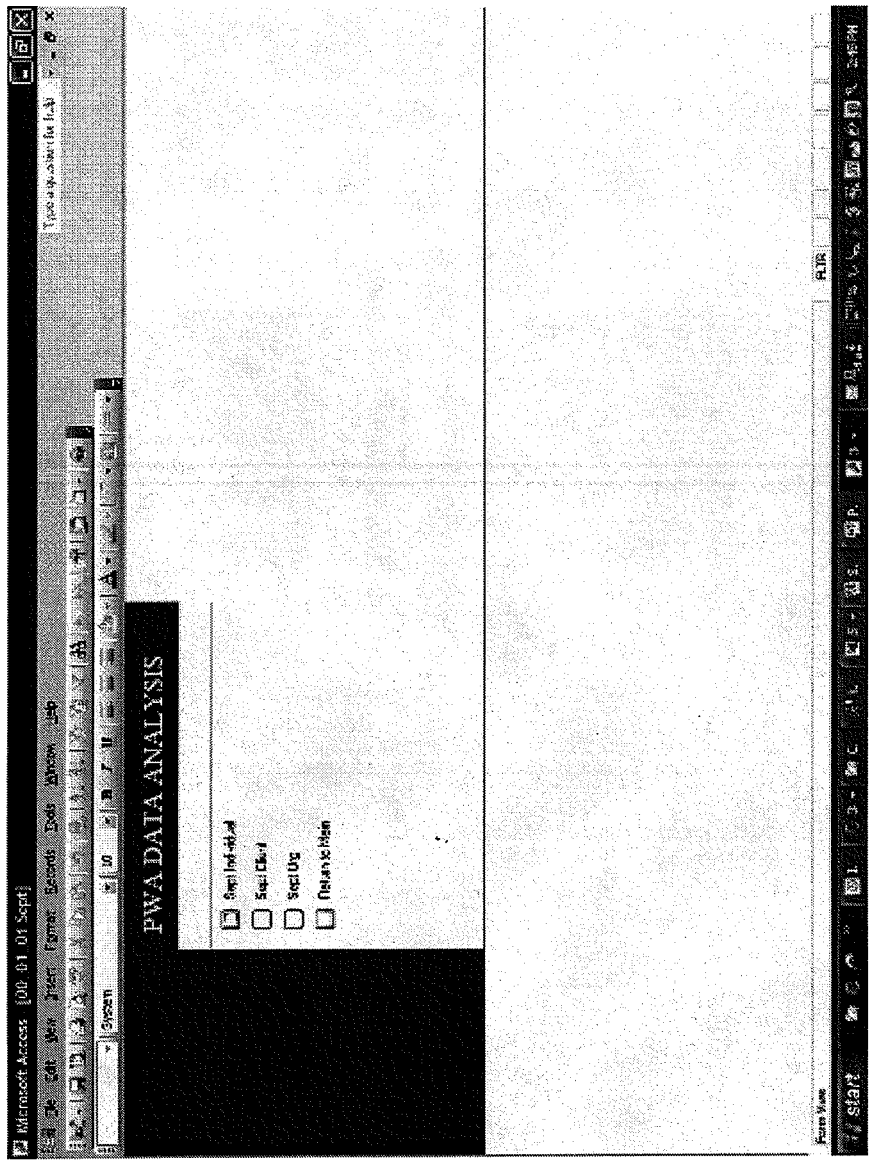
FIG. 30 shows a screenshot in which each time period being broken down into individual, client and organization level results in accordance with an embodiment of the invention.

FIG. 30 shows screenshot 3000 in which each time period being broken down into individual, client and organization level results in accordance with an embodiment of the invention.

Figure 31:
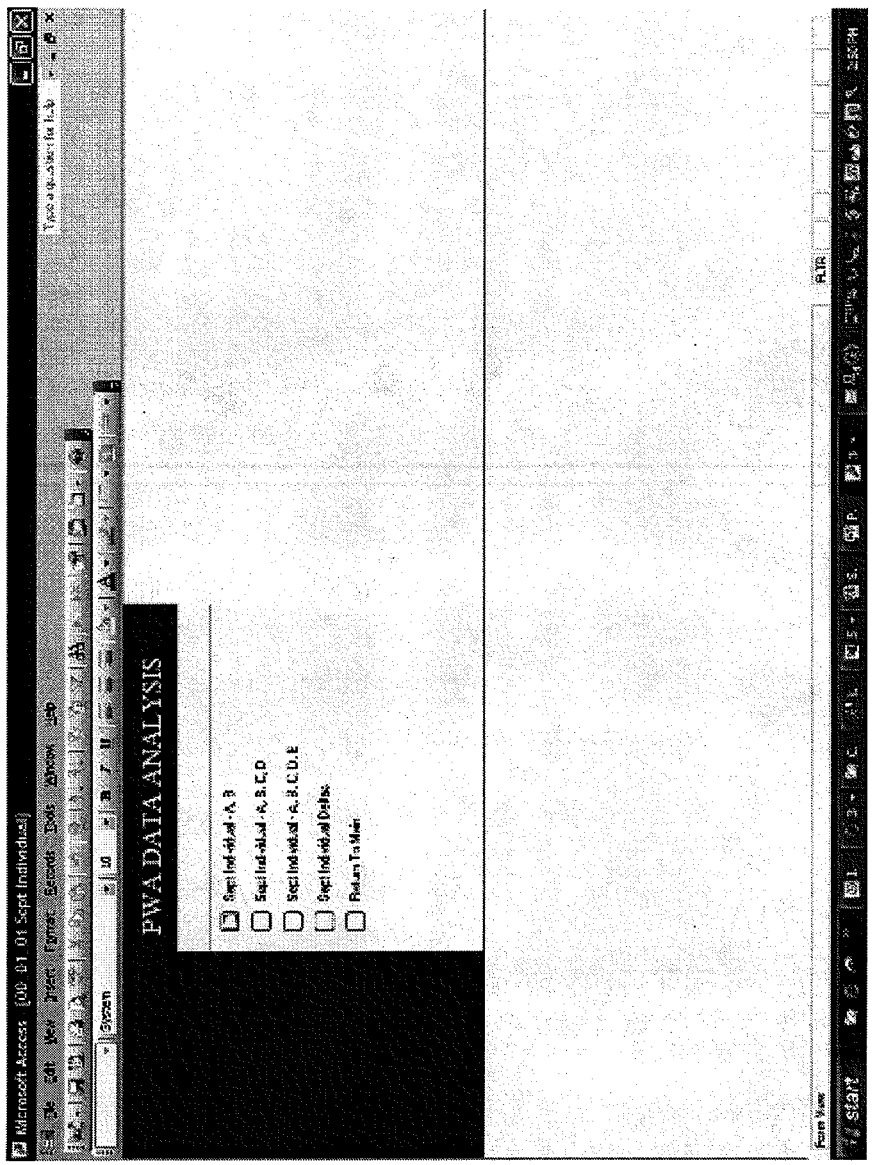
FIG. 31 shows a screenshot in which reports including category analysis and multiple category analysis (mirrored for client and organization) in accordance with an embodiment of the invention.

FIG. 31 shows screenshot 3100 in which reports including category analysis and multiple category analysis (mirrored for client and organization) in accordance with an embodiment of the invention.

Figure 32:
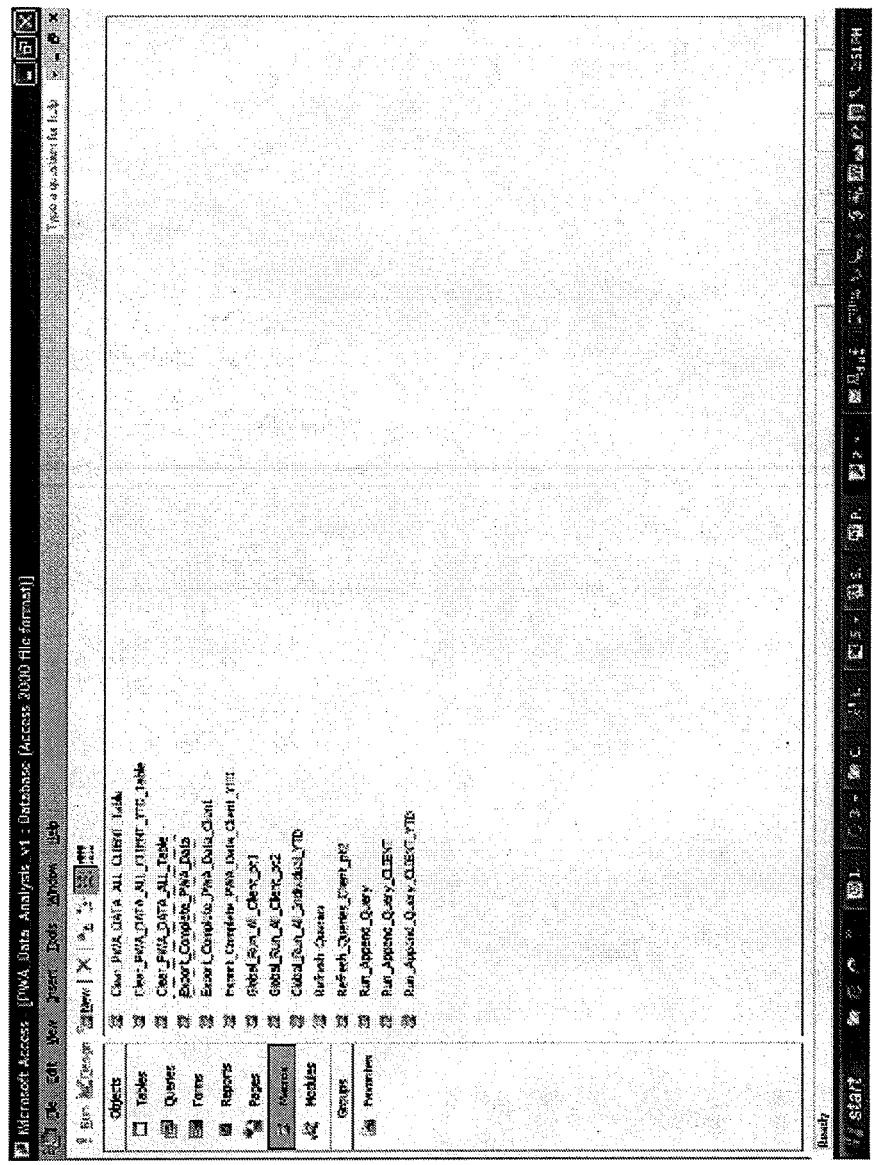
FIG. 32 shows a screenshot in which macros being built to re-integrate individual, client, and organization level category report results into pre-formatted spreadsheets in accordance with an embodiment of the invention.

FIG. 32 shows screenshot 3200 in which macros being built to re-integrate individual, client, and organization level category report results into pre-formatted spreadsheets in accordance with an embodiment of the invention.

FIG. 33 shows screenshot 3300 in which exemplary exported spreadsheet results in accordance with an embodiment of the invention.

Figure 34:
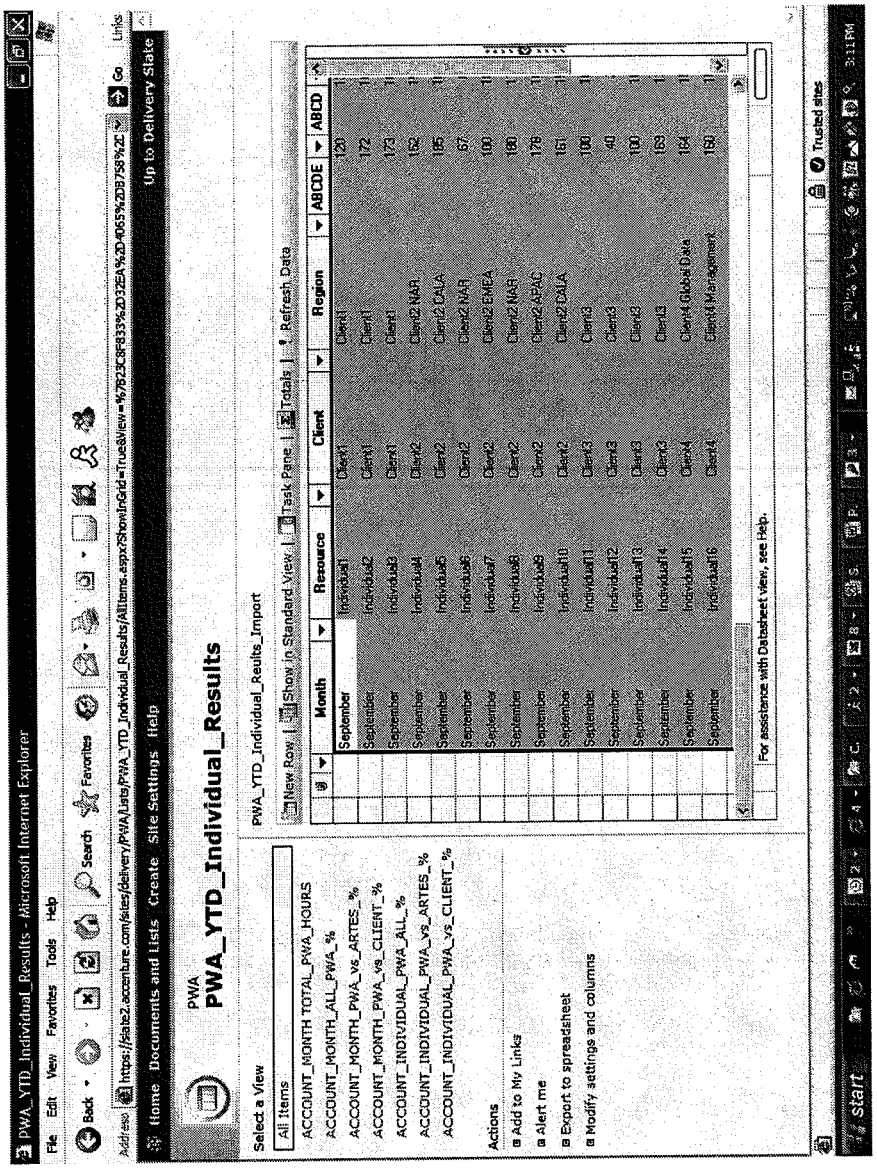
FIG. 34 shows a screenshot in which results imported to a Microsoft Sharepoint® site (form built to match exported spreadsheet results) in accordance with an embodiment of the invention.

FIG. 34 shows screenshot 3400 in which results imported to a Microsoft Sharepoint site (form built to match exported spreadsheet results) in accordance with an embodiment of the invention.

Figure 35:
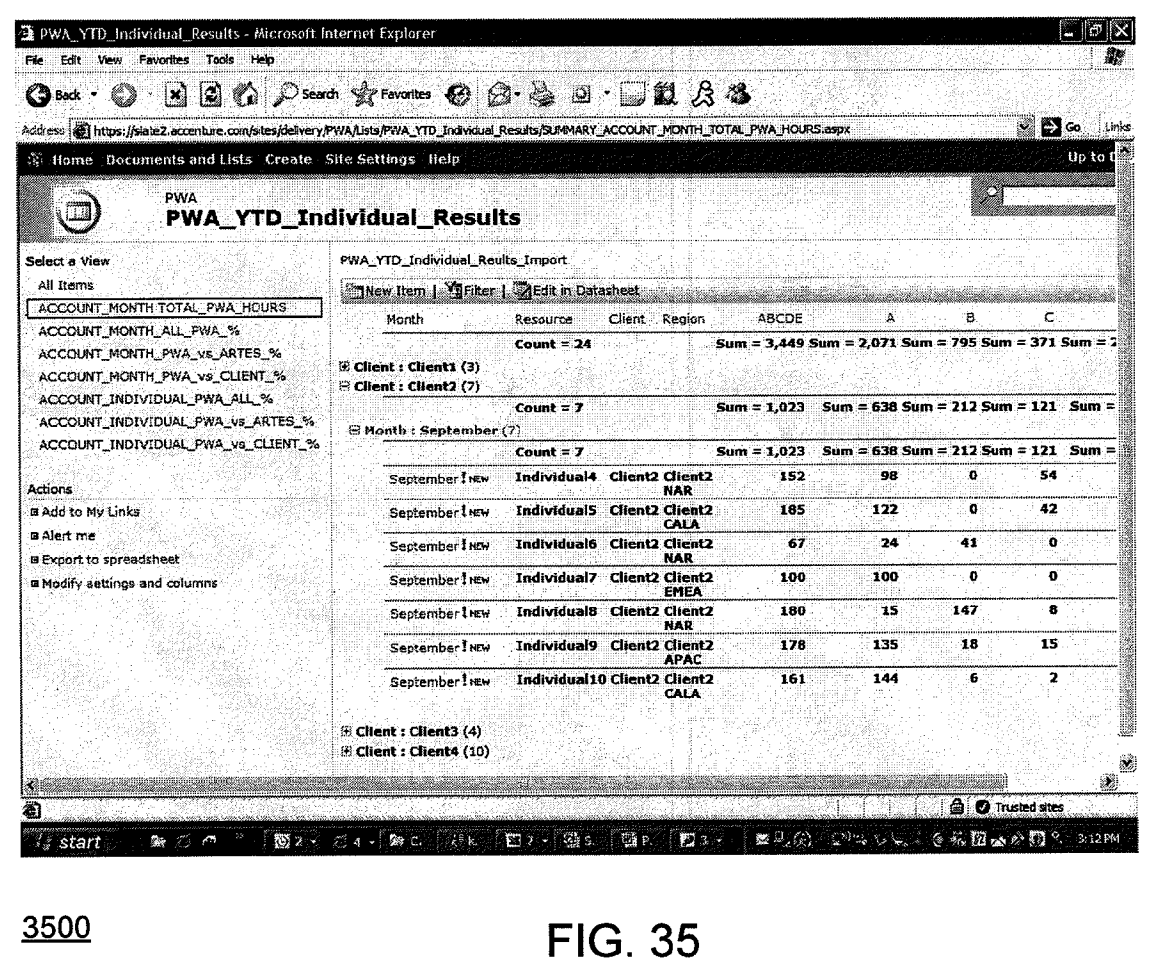

FIG. 35 shows screenshot 3500 in which reports providing an analysis across individual and account in accordance with an embodiment of the invention.

FIG. 36 shows computer system 3600 that generates an invoice from work entries in accordance with an embodiment of the invention. Workers may enter work entries to computer 3607 through computers 3601, 3603, and 3605 and network 3609. Computer 3607 uses rules (e.g., as specified from screenshots 200 and 300 as shown in FIGS. 2 and 3, respectively) to process work entries that are associated with the corresponding account to determine work that is client paid (e.g., category A as illustrated with FIG. 2). An invoice (bill), e;g., invoice 3651 or invoice 3653, is generated for the account, in which the client is billed only for work that is client paid.

The mapping between work codes and categories may vary for different accounts as a result of different contractual obligations. Consequently, computer 3607 may use different rules for different accounts when generating invoices 3651 and 3653.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A computer-assisted method comprising:
    mapping a plurality of work codes to a plurality of categories for an account to form a mapping;
    receiving a plurality of work entries that are associated with the account, wherein each work entry is entered for a worker and is associated with one of the plurality of categories;
    forming a data structure comprising account data, the data structure comprising a hypercube;
    a spreadsheet application querying the data structure and porting account data into a first spreadsheet file;
    performing data analysis using a hypercube approach comprising more than three dimensions, the more than three dimensions comprising time, the account, and a work code; and
    aggregating the plurality of work entries in a report for the account.

2. The method of claim 1, further comprising:
    mapping the worker to a client.

3. The method of claim 2, further comprising:
    mapping the worker to a client region.

4. The method of claim 1, wherein one of the plurality of work codes maps to a different category for different accounts.

5. The method of claim 1, wherein a workplan is associated with the account and further comprising:
    setting metadata for the workplan.

6. The method of claim 1, wherein the receiving the plurality of work entries further comprises using a network.

7. The method of claim 6, further comprising:
    the spreadsheet application linking the first spreadsheet file to the data structure.

8. The method of claim 7, further comprising:
    synchronizing contents of a database to the first spreadsheet file.

9. The method of claim 8, further comprising:
    categorizing and aggregating the contents of the database.

10. The method of claim 9, further comprising:
    exporting the contents of the database to a second spreadsheet file.

11. The method of claim 10, further comprising:
    providing the report from the exported content based on the worker and the account.

12. The method of claim 1, further comprising:
    determining an efficiency measure for the worker from the plurality of work entries.

13. The method of claim 1, further comprising:
    modifying the mapping, wherein at least one of the plurality of work codes maps to a different one of the plurality of categories.

14. A computer-readable storage medium storing computer-executable instructions that, when executed, cause a processor to perform a method comprising:
    mapping a plurality of work codes to a plurality of categories based for an account to form a mapping;
    receiving a plurality of work entries that are associated with the account, wherein each work entry is entered for a worker and is associated with one of the plurality of categories;
    forming a data structure comprising account data, the data structure comprising a hypercube;
    a spreadsheet application querying the data structure and porting account data into a first spreadsheet file;
    performing data analysis using a hypercube approach comprising more than three dimensions, the more than three dimensions comprising time, the account, and a work code; and
    aggregating the plurality of work entries in a report for the account.

15. The computer-readable medium of claim 14, said method further comprising:
    setting metadata for a workplan associated with the account.

16. The computer-readable medium of claim 14, wherein the receiving the plurality of work entries further comprises using an on-line entry system.

17. The computer-readable medium of claim 16, said method further comprising:
the spreadsheet application linking the first spreadsheet file to the data structure.

18. The computer-readable medium of claim 17, said method further comprising:
synchronizing contents of a database to the first spreadsheet file.

19. The computer-readable medium of claim 18, said method further comprising:
categorizing and aggregating the contents of the database.

20. The computer-readable medium of claim 19, said method further comprising:
exporting the contents of the database to a second spreadsheet file.

21. The computer-readable medium of claim 20, said method further comprising:
providing the report from the exported content based on the worker and the account.

22. The computer-readable medium of claim 14, said method further comprising:
determining an efficiency measure for the worker from the plurality of work entries.

23. A computer-assisted method comprising:
mapping a plurality of work codes to a plurality of categories for a first account to form a mapping;
receiving a first plurality of work entries that are associated with the first account, wherein each work entry is entered by a worker and is associated with one of the plurality of categories;
forming a data structure comprising account data, the data structure comprising a hypercube;
a spreadsheet application querying the data structure and porting account data into a first spreadsheet file;
performing data analysis using a hypercube approach comprising more than three dimensions, the more than three dimensions comprising time, the account, and a work code; and
aggregating the first plurality of work entries in a first invoice for the first account.

24. The method of claim 23, wherein a workplan is associated with the first account and further comprising:
setting metadata for the workplan.

25. The method of claim 23, wherein the receiving the plurality of work entries further comprises using a communication network.

26. The method of claim 25, further comprising:
the spreadsheet application linking the first spreadsheet file to the data structure.

27. The method of claim 26, further comprising:
synchronizing contents of a database to the first spreadsheet file.

28. The method of claim 27, further comprising:
categorizing and aggregating the contents of the database.

29. The method of claim 28, further comprising:
exporting the contents of the database to a second spreadsheet file.

30. The method of claim 29, further comprising:
providing the first invoice from the exported content based on the worker and the first account.

31. The method of claim 23, further comprising:
mapping the plurality of work codes to the plurality of categories for a second account, wherein at least one work code maps to a different category than for the first account;
receiving a second plurality of work entries that are associated with the second account; and
aggregating the second plurality of work entries in a second invoice for the second account.

* * * * *